US007324546B1

(12) United States Patent
Rowett et al.

(10) Patent No.: US 7,324,546 B1
(45) Date of Patent: Jan. 29, 2008

(54) NETWORK ROUTER INTEGRATED ONTO A SILICON CHIP

(75) Inventors: Kevin J. Rowett, Cupertino, CA (US); Crosswell C. Collins, Oakland, CA (US); Eric R. Buell, Felton, CA (US)

(73) Assignee: Cisco Technology, Inc., San Jose, CA (US)

(*) Notice: Subject to any disclaimer, the term of this patent is extended or adjusted under 35 U.S.C. 154(b) by 1290 days.

(21) Appl. No.: 10/043,968

(22) Filed: Jan. 10, 2002

Related U.S. Application Data

(60) Division of application No. 09/359,055, filed on Jul. 21, 1999, now Pat. No. 6,366,583, which is a continuation of application No. 08/709,178, filed on Sep. 6, 1996, now Pat. No. 5,991,817.

(60) Provisional application No. 60/023,551, filed on Aug. 7, 1996.

(51) Int. Cl.
*H04L 12/56* (2006.01)
(52) U.S. Cl. .................................. 370/458
(58) Field of Classification Search ............... 370/363, 370/381, 382, 371, 400, 401, 428, 458; 709/212–216
See application file for complete search history.

(56) References Cited

U.S. PATENT DOCUMENTS

| | | | |
|---|---|---|---|
| 4,803,485 A | | 2/1989 | Rypinski |
| 5,005,170 A | * | 4/1991 | Nelson ........................ 370/535 |
| 5,229,994 A | | 7/1993 | Balzano et al. |
| 5,598,408 A | * | 1/1997 | Nickolls et al. ............ 370/351 |
| 5,640,399 A | | 6/1997 | Rostoker et al. |
| 5,663,961 A | * | 9/1997 | McRoberts et al. ......... 370/412 |

(Continued)

OTHER PUBLICATIONS

Article from FastForward, Dec. 1993, *Three Applications That Are Possible Only With 500K Technology*, pp. 8, 9 and 12.

(Continued)

*Primary Examiner*—Wing Chan
*Assistant Examiner*—Duc Duong
(74) *Attorney, Agent, or Firm*—Stolowitz Ford Cowger LLP

(57) ABSTRACT

A router is integrated onto a single silicon chip and includes an internal bus that couples multiple data receive and transmit channels to a central processing unit. The channels each have an external interface for connecting to different LAN or WAN networks. The serial channels are convertible into one or more time division multiplexed (TDM) channels. A time slot assigner (TSA) assembles and disassembles data packets transferred in TDM formats, such as ISDN. The serial channels are used for separately processing data packets in each TDM time slot. The TSA is programmable to operate with different TDM formats. A single direct memory access controller (DMAC) is coupled to each serial channel and an Ethernet channel and conducts data transfers on the internal router bus through a common port. The DMAC uses a novel bus protocol that provides selectable bandwidth allocation for each channel. The router architecture includes different interface circuitry which is also integrated onto the silicon chip. The interface circuitry includes user definable input/output (I/O) pins with programmable pulse width detection. The user definable I/O provides synchronous and asynchronous interfacing to peripheral devices with different timing constraints. The interface circuitry also includes a DRAM controller having a programmable timing control circuit that operates with memory devices having different timing and memory block sizes.

18 Claims, 25 Drawing Sheets

U.S. PATENT DOCUMENTS

| | | | |
|---|---|---|---|
| 5,668,809 A | | 9/1997 | Rostoker et al. |
| 5,675,829 A | * | 10/1997 | Oskouy et al. ............. 710/6 |
| 5,708,659 A | | 1/1998 | Rostoker et al. |
| 5,726,985 A | * | 3/1998 | Daniel et al. ............ 370/382 |
| 5,796,735 A | * | 8/1998 | Miller et al. ........... 370/395.4 |
| 5,982,749 A | * | 11/1999 | Daniel et al. ............ 370/233 |
| 5,991,817 A | * | 11/1999 | Rowett et al. ........... 309/250 |
| 6,026,443 A | * | 2/2000 | Oskouy et al. ........... 709/230 |

OTHER PUBLICATIONS

Motorola MC68360 Quad Integrated Communication Controller Product Brief, copyright 1993, pp. 1-14.

Motorola M68360QUADS-040 User's Manual, Issue 1.0, Aug. 16, 1993, pp. 1-86.

Motorola MC68360 Quad Integrated Communications Controller User's Manual, Dec. 4, 1996.

Article from FastForward, Dec. 1993, *Three Applications that are Possible only with 500K Technology*, pp. 8, 9 and 12.

Motorola MC68360 Quad Integrated Communication Controller Product Brief, copyright 1993, pp. 1-14.

Motorola M68360QUADS-040 User's Manual, Issue 1.0, Aug. 16, 1993, pp. 1-86.

\* cited by examiner

MODULE INTERFACE

PIPELINED ARBITRATION
PROTOCOL EXAMPLE

ARBITRATION PROTOCOL EXAMPLE
BACK-TO-BACK TRANSACTION

ARBITRATION PROTOCOL EXAMPLE
PARKING

DRAM CONTROLLER

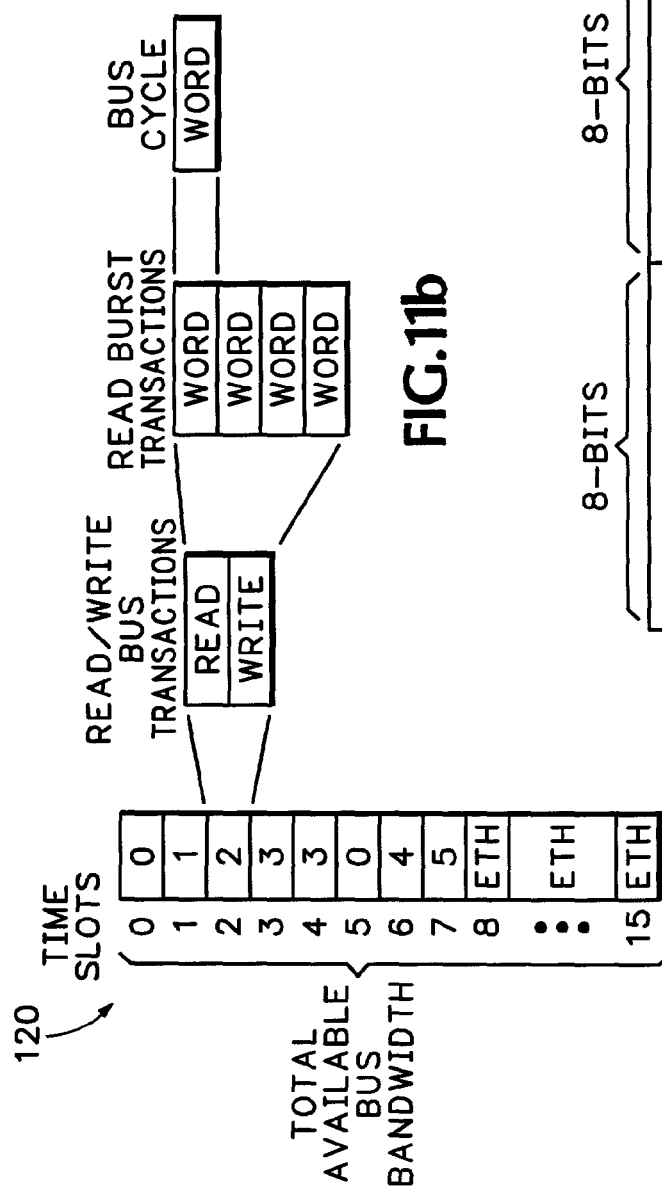
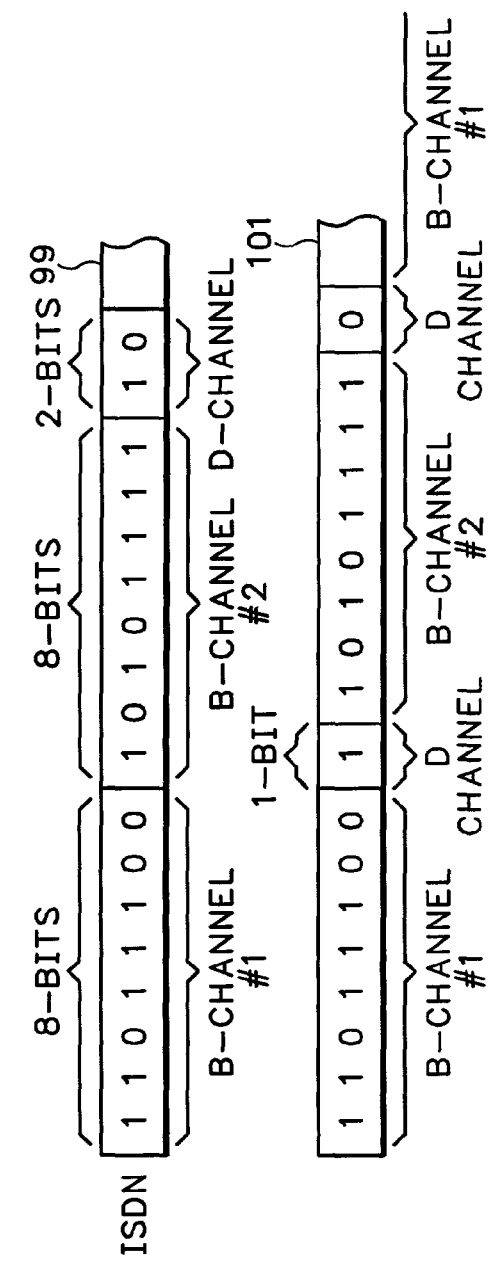
FIG.11b
FIG.12

TSA RECEIVE
BLOCK DIAGRAM

TSA TRANSMIT
BLOCK DIAGRAM

DMAC BLOCK DIAGRAM

BUFFER DESCRIPTOR

DMA CONTROL & STATUS
FIELD OF DESCRIPTOR

DMAC ADDRESS & CONTROL

UDIO BLOCK DIAGRAM

PC CARD INTERFACE

NETWORK ROUTER INTEGRATED ONTO A SILICON CHIP

This application is divisional of prior U.S. Ser. No. 09/359,055, filed Jul. 21, 1999, which is a continuation of prior U.S. Ser. No. 08/709,178, filed Sep. 6, 1996, now U.S. Pat. No. 5,991,817, which claims priority from U.S. Provisional Application Ser. No. 60/023,551, filed Aug. 7, 1996.

BACKGROUND OF THE INVENTION

This invention relates to routers used for routing messages between a local area network (LAN) and one or more wide area networks (WANs) and more particularly to a router architecture integrated onto a single silicon chip that is adaptable to a wide variety of network configurations.

A router is essentially a computer dedicated to the task of routing messages between different network protocols and between different networks having similar protocols. The router must contain the necessary input and output connections for linking different network systems together. Routers also have an internal computer architecture and associated control for converting data packets between different network protocols. For example, Ethernet is a widely-used standard for LANs that allows data transfer rates of 10 million bits per second (Mbps). Ethernet can be used to implement bus architecture networks. In contrast, WANs typically implement point-to-point connections and transfer data packets at rates below 1 Mbps.

A variety of different routers and associated router architectures have been developed to support different network configurations. Routers typically include multiple circuit boards connected together in a chassis which typically has a size comparable with the processing box of a personal computer. The cabinet, circuit boards, interface circuitry, etc., used to build a router are expensive and require a substantial amount of assembly time. To reduce the physical size and cost of routers and the amount of time required for assembly, it would be necessary to integrate many of the different router functions onto the same circuit board or processing chip. However, due to the variety of different network configurations and protocols used in different network systems, current router architectures are not capable of adequately supporting a wide variety of network configurations, network protocols and other peripheral devices without considerable cost. For example, routers are typically designed to operate with a given combination of external serial and time division multiplexed data lines. The router may not support the new network configuration if the format of the data stream transmitted over the lines changes or a different combination of external network lines are used.

The time required for a router to convert and route data packets into different network protocols and between different networks depends upon how efficiently data packets are transferred between different router processing elements. However, different amounts of data can be transmitted to the router at any given time from any one of the connected networks. The internal bus architecture in current router architectures have a dedicated bandwidth allocation scheme for processing data packets from each external network connection. However, dedicated bandwidth allocation does not utilize internal bus transactions efficiently for network data packets that may be received or transmitted at variable data rates from each connected network. Thus, router performance can degrade for certain network processing conditions.

Accordingly, a need remains for a router architecture integrated onto a single silicon chip that is adaptable to a wide variety of different network systems and peripheral interfaces while at the same time being adaptable to changing data processing requirements and reducing the overall cost of the router.

SUMMARY OF THE INVENTION

A complete router architecture is integrated onto a single silicon chip and includes an internal bus that couples multiple channels to a central processing unit. The channels each have an external interface for connecting to different LAN or WAN lines. Multiple serial channels and an Ethernet channel receive and transmit data packets that are converted between different network packet protocols by the CPU. The serial channels have a novel architecture that allows conversion into one or more time division multiplexed (TDM) channels.

A serial line multiplexer (SLM) provides an external interface for each one of the multiple serial channels. The serial channels each include serial communication controllers (SCCs) and FIFOs for temporarily storing network data packets. A time slot assigner (TSA) is coupled between the SLM and the SCCs and assembles and disassembles data packets transferred in TDM formats such as ISDN. The TSA is programmable to operate with different TDM formats.

A single direct memory access (DMA) controller is coupled to each serial channel and the Ethernet channel and conducts data transfers over the internal router bus. The DMA uses an internal bus bandwidth allocation protocol that can adjust the percentage of bus bandwidth dedicated to each channel. The bus bandwidth allocation protocol increases bandwidth efficiency by varying the number and location of time slots each channel is assigned to match the channel's bandwidth requirements.

The DMA controller performs block data transfers without alignment restrictions for data start and end points allowing block transfers of packet data to begin and end on any byte boundary. The capability to support non-aligned block transfers of packet data avoids burdening the CPU with time-consuming re-alignment of the packet data to boundaries imposed by a DMA controller.

The SCC also transfers data in either bit direction, most significant bit (MSB) first or least significant bit (LSB) first. The normally CPU-intensive task of bit swapping is then performed by the SCC on-the-fly either while data packets are transferred into memory from a router interface, or as data is moved from memory to the interface.

The DMA controller services multiple transmit and receive interfaces. Each interface can implement data link channels having widely varying requirements for bandwidth and latency. For instance, an Ethernet interface operates at 10 million bits per second (Mbps), while a serial interface may be attached to a user terminal where the max data rate is in the range of 500 bps. The programmable bus bandwidth allocation allows each channel's portion of the total available bus bandwidth to be individually adjusted. The maximum latency for responding to data in each channel is also adjustable.

The router architecture includes different interface circuitry which is also integrated onto the silicon chip. The interface circuitry allows the router to operate optimally with a wider variety of memory and peripheral devices. The interface circuitry includes a user definable input/output (I/O) circuit with programmable pulse width detection. The user definable I/O circuit provides synchronous and asynchronous interfacing to peripheral devices with different timing constraints. The interface circuitry also includes two UART interface circuits, a PC card controller and an external bus interface.

The router includes a DRAM controller having a programmable timing control circuit that supports memory devices with different timing requirements and selectable memory bank sizes. Thus, the router can operate with a wider variety of memory configurations than current router architectures.

The router is integrated onto a single silicon chip reducing manufacturing and assembly costs while at the same time providing an architecture that operates more efficiently with a wider variety of network configurations and network protocols. The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 11b is a diagram showing internal bus time slots for the router shown in FIG. 1.

FIG. 12 is a diagram showing different time division multiplexed data formats.

DETAILED DESCRIPTION

Figure 1:
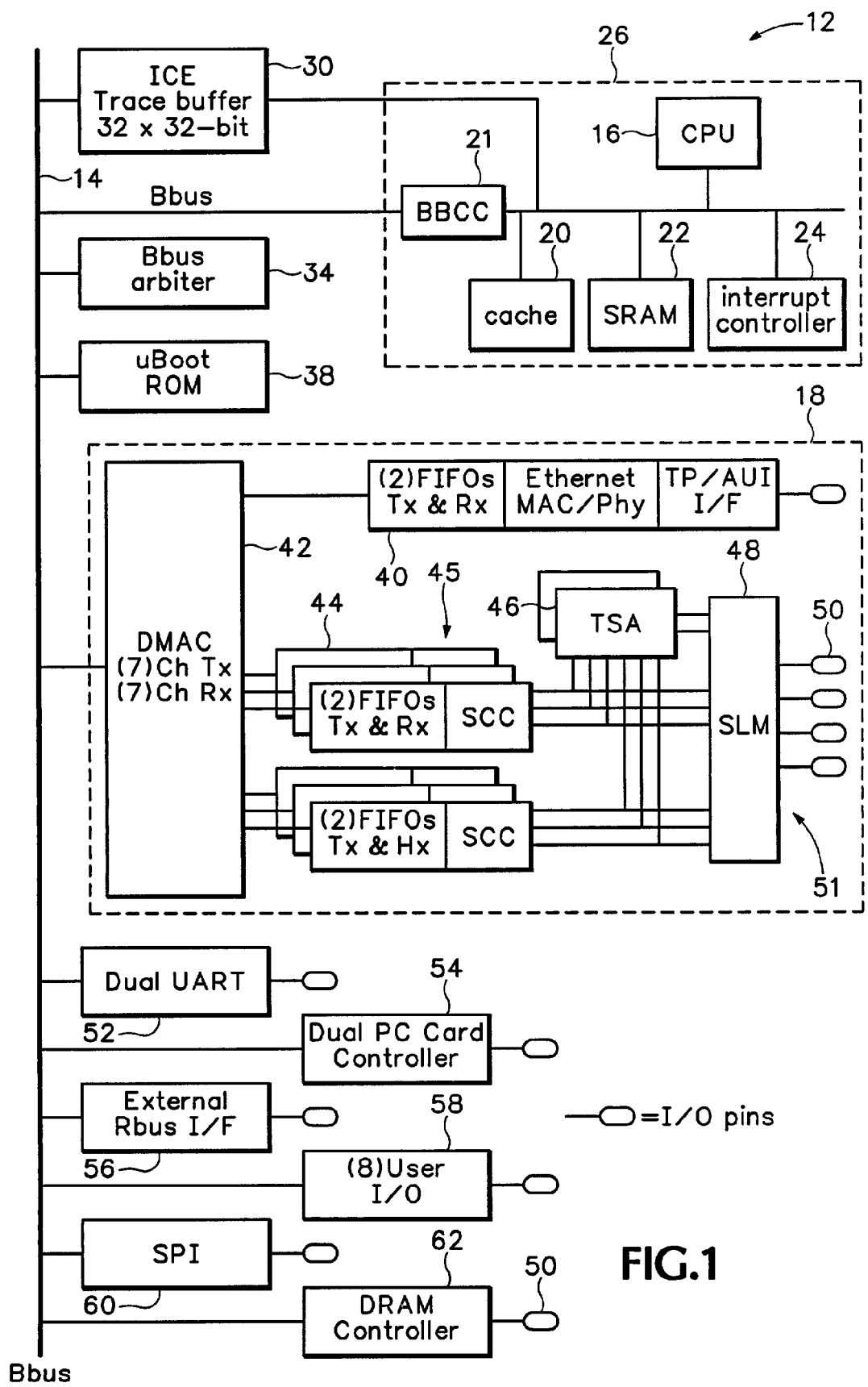
FIG. 1 is a diagram of a router architecture according to the invention and integrated onto a single silicon chip.

Referring to FIG. 1, a router 12 is integrated onto a single silicon chip. The router 12 includes an internal Bbus 14 coupled to a CPU block 26. The CPU block 26 includes a central processing unit 16, cache memory 20, SRAM 22, an interrupt controller 24 and a bus interface unit and cache controller (BBCC) 21 which are all generally known to one skilled in the art. The Bbus 14 is also coupled to a multichannel circuit 18 which includes an Ethernet channel 40 and multiple serial channels referred to generally as 51. The serial channels 51 are convertible into one or more time division multiplexed channels for transmitting and receiving data packets, for example, on ISDN lines. A single DMA controller 42 couples both the ethernet channel 40 and all the serial channels 51 to the Bbus 14.

The serial channels 51 include a serial line multiplexer (SLM) 48 coupled to I/O pins 50 of the router chip 12. Multiple serial communication controllers (SCCs) 45 are each coupled between a direct memory access controller (DMAC) 42 and the SLM 48 and individually control each one of the serial channels. Transmit and receive FIFOs 44 are located in each serial channel and store transmit and receive data packets. A time slot assigner (TSA) circuit 46 is coupled between the SLM 48 and the SCCs 45.

Interface circuitry coupled to the internal bus and integrated onto the silicon chip include dual UARTs 52, dual PC card controllers 54, an external Rbus interface circuit 56, a user definable input/output circuit 58 having programmable pulse width detection, a serial peripheral interface (SPI) 60 and a DRAM controller 62. A bus arbiter 34 grants control of the internal bus to the different router processing elements. A microboot ROM 38 controls initial boot up of the router 12 when first powered on and an in-circuit emulator 30 is used for tracing internal signals of the router for router analysis and debug.

Figure 2:
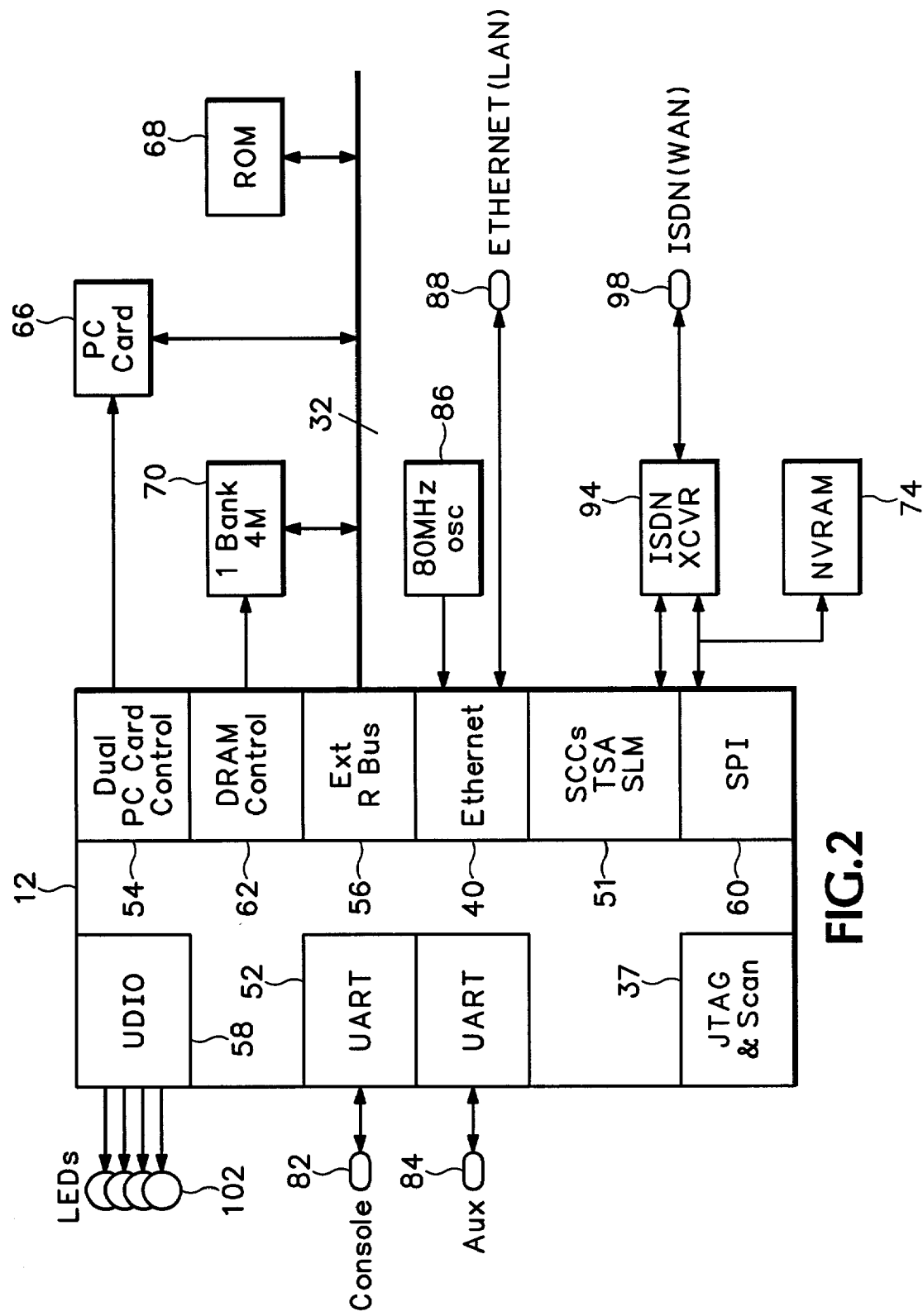
FIG. 2 is a diagram of a first configuration for the router shown in FIG. 1.

FIG. 2 shows a first configuration for router 12 and includes a connector to an Ethernet LAN line 88 coupled to the ethernet channel 40. An oscillator 86 drives the clock in the ethernet channel 40. An ISDN WAN line 98 is coupled through a transceiver 94 to the serial channels 51. Nonvolatile memory 74 and transceiver 94 are controlled by router 12 via SPI 60. The LAN 88 operates at 20 Mbits/sec in full duplex and 10 Mbits/sec at half duplex. The ISDN 98 operates at 128 kbits/sec. The Bbus 14 (FIG. 1) is connected through an external Rbus interface 56 to a PC card 66, DRAM 70 and ROM 68. The UARTs 52 are coupled to a console 82 and an auxiliary port. The user definable I/O 58 is coupled to multiple light-emitting diodes 102.

Figure 3:
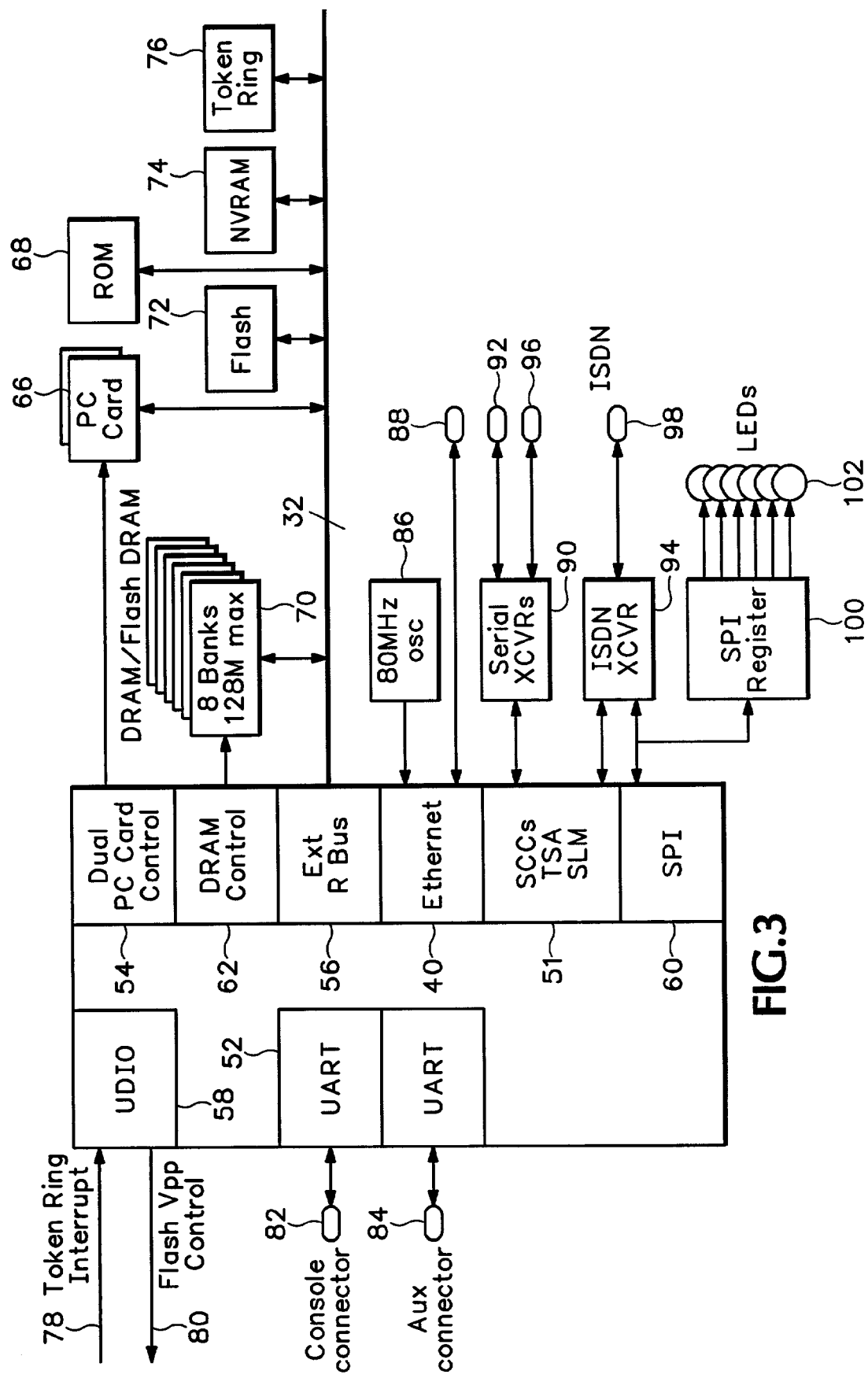
FIG. 3 is a diagram of a second configuration for the router shown in FIG. 1.

A second configuration for the router 12 is shown in FIG. 3. The serial channels 51 are coupled to both an ISDN line 98 and two serial lines 92 and 96. The serial lines 92 and 96, for example, carry a continuous serial data stream over an E1 telephone line at 2.048 Mbits/sec or a T1 line at 1.44 Mbits/sec. The SPI 60 is coupled through a set of registers 100 to LEDs 102. The internal Bbus 14 (FIG. 1) is coupled through Rbus interface 56 to multiple blocks of memory 70 that include both regular DRAM, flash memory 72, an additional PC card 66, non-volatile RAM 74 and a token ring control chip 76 such as the Texas Instruments Model No. TMS380. The user definable I/O 58 is coupled to a token ring interrupt control line 78 from token ring controller 76 and a control line 80 from flash memory 72.

Figure 4:
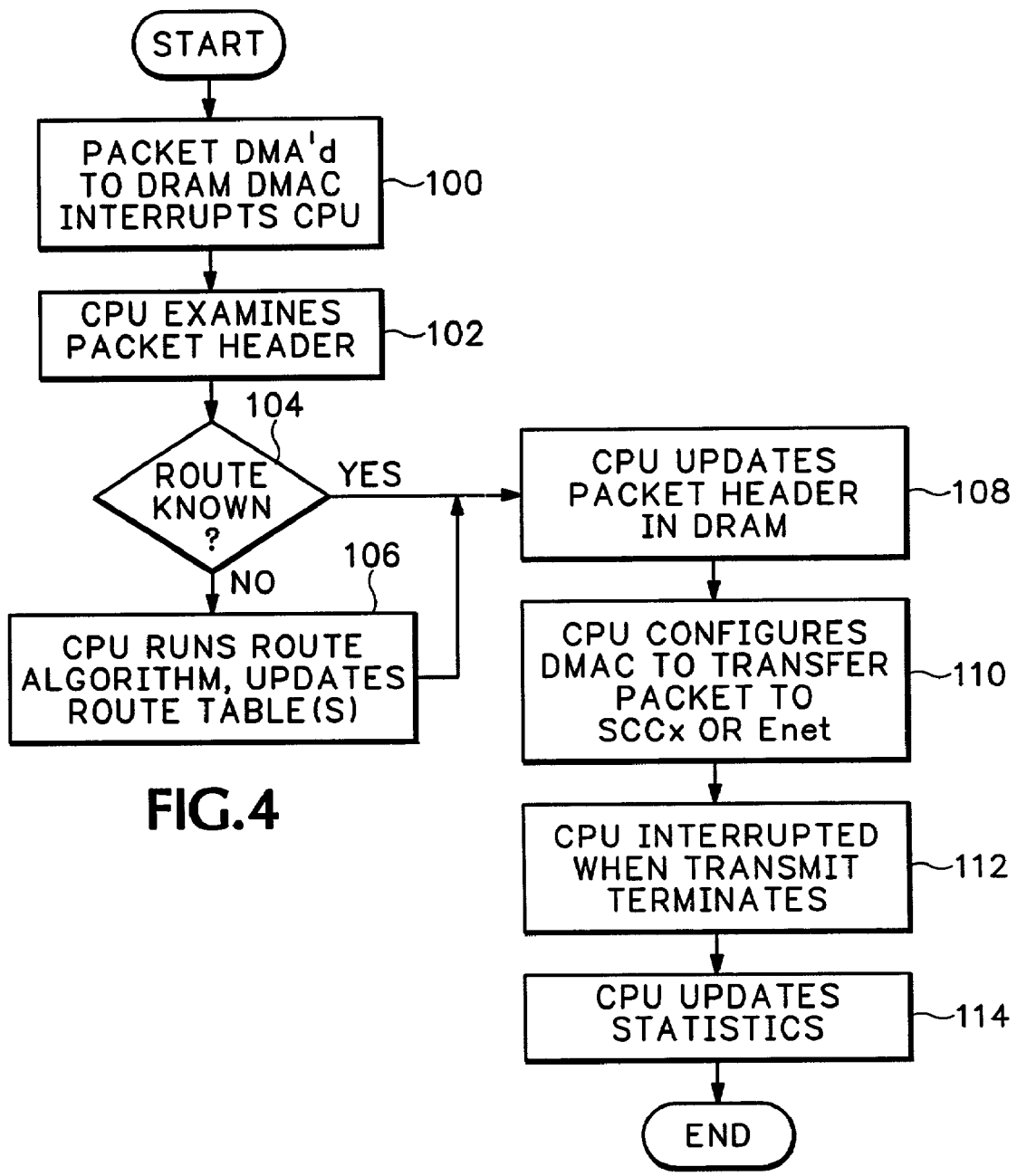
FIG. 4 is a step diagram showing a typical routing protocol for the router shown in FIG. 1.

The router 12 routes and translates network data packets between the I/O pins 50 connected to the Ethernet line 88 and the I/O pins connected to the serial lines 92, 96 and 98. FIG. 4 is a step diagram showing one example of the typical sequence of events conducted by router 12 for routing a data packet between the Ethernet line 88 and one of the serial lines. In step 100, a network packet is loaded into the FIFOs in either the Ethernet channel 40 or serial channels 51. The control circuitry in the channel notifies the DMAC 42 that data packets are ready to be transferred to DRAM 70. The DMAC 42 conducts a direct memory access to DRAM 70 and then interrupts the CPU 16. The CPU 16 examines a packet header in step 102 for routing information and decides whether the route is known for the data packet in decision step 104.

If the route for the packet is unknown, the CPU 16 runs a routing algorithm to determine the destination for the packet and updates router tables in step 106. If the route for the packet is known, the CPU 16 in step 108 updates the packet header in DRAM 70, adds the packet to a transmit queue in the DMAC 42, and updates receive statistics. The CPU 16 in step 110 configures the DMAC 42 to transfer the data packet to one of the serial channels 51 or to the Ethernet channel 40. In step 112, the CPU is interrupted after the data packets have been transmitted and step 114 updates transmit statistics.

Bus Arbitration

Figure 5:
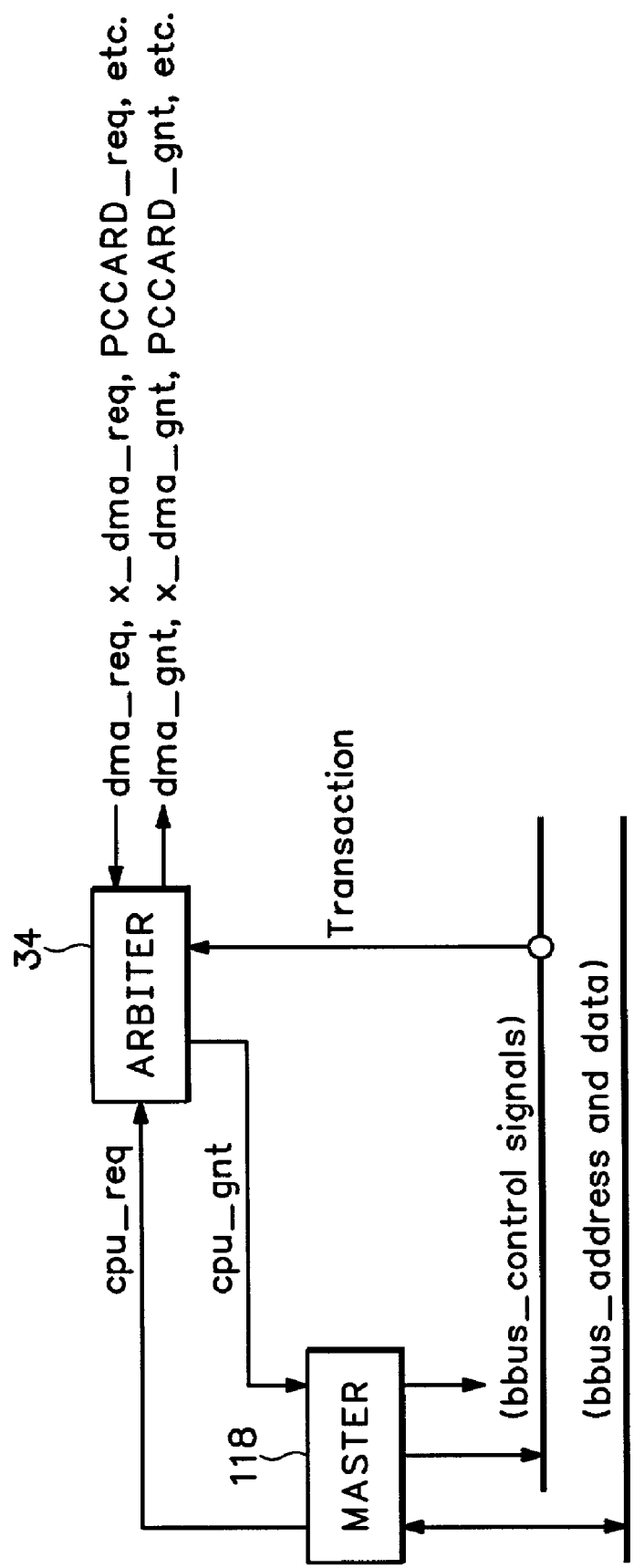
FIG. 5 is a block diagram showing signals for arbitrating bus transactions on an internal bus in the router shown in FIG. 1.

FIG. 5 is a detailed block diagram showing arbitration signals between the arbiter 34 and different processing devices 118 in the router acting as master of the Bbus 14. The arbiter 34 independently arbitrates Bbus access between the masters. The protocol conducted by arbiter 34 reduces the number of clock cycles required to initiate data packet transfers by pregranting the Bbus 14 to devices, parking bus grant to devices on the Bbus 14 and pipelining.

The arbiter 34 arbitrates the requests between the CPU 16, DMAC 42, external DMA controllers (not shown) coupled to Rbus interface 56, PC cards 66, or any other device that requires master status on Bbus 14. A transaction signal is generated by the bus master and clk is a Bbus clock signal. Signals coupled to CPU 16 are identified by the prefix cpu_and signals coupled to DMAC 42 have the prefix dma_.

The following is terminology associated with the arbitration protocol.

Arbitration Cycles: The actual clock cycle overhead required to switch from one master to another (dead band).

Bus Access Cycles: The number of clock cycles required to complete a random register or memory access including block access (utilized bandwidth).

Priority: Bus access ordering scheme that establishes the desired bandwidth utilization based on a specific application (software and hardware).

Back-to-Back Request: The request signal that remains active after being granted. The arbiter 34 may continue to grant the requested device if no other device requests the Bbus 14. The back-to-back request will have lower priority.

Parking: The active state of an arbiter that grants the bus to a master when no request is active. Parking is lowest priority.

Bus Transaction Signal: A signal generated by the current master to indicate that the bus is currently owned. A device granted the Bbus 14 monitors the bus transaction signal in order to be ready to take over the Bbus 14 when the signal is deasserted.

Pipelined Arbitration Protocol: The arbiter pregrants another master as soon as the current master takes ownership of the Bbus.

Arbitration Protocol

Bbus requests are granted in a round-robin scheme. The arbiter 34 pregrants another master as soon as the transaction signal is asserted by the new bus master. Pregranting requires that the current master relinquish the Bbus 14 at the end of a current bus transaction cycle and cannot start another bus transaction unless granted the bus again by the arbiter 34. The pregranted master monitors the Bbus 14 and takes over one cycle after the current bus master relinquishes the bus by asserting the bus transaction signal high. The master pregranting scheme saves a dead band clock cycle in the Bbus 14 by negotiating bus transactions before the Bbus 14 is actually available for the transaction. The current master is granted back-to-back requests only if no other Bbus request is active and the request remains active one cycle after being granted. The back-to-back grant will be removed as soon as another request arrives.

The current master relinquishes the bus at the end of the current bus transaction cycle and cannot start another bus transaction without making another bus request. The arbiter 34 parks on the CPU 16 when there are no other bus requests. The parked CPU 16 can then start a bus transaction without requesting the Bbus 14. The arbiter 34 degrants the CPU 16 as soon as another request arrives. The current master relinquishes the bus at the end of the current bus transaction cycle and cannot start another bus transaction without first making another request to the arbiter 34. This arbitration protocol ensures that there is no concurrent start from more than one master and no ownership contention between masters via the use of the bus transaction signal.

Pipeline Arbitration Protocol

Figure 6:
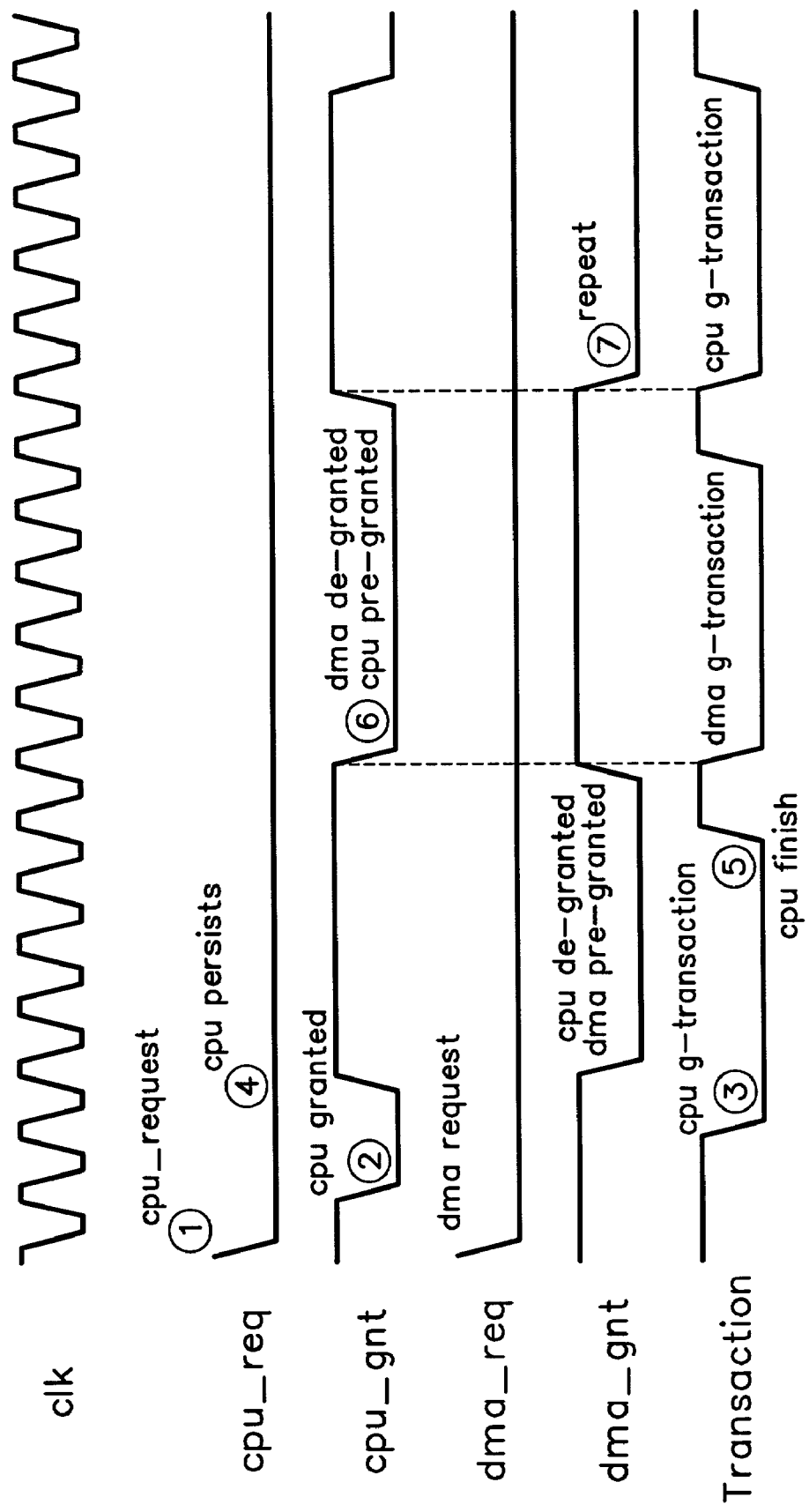
FIG. 6 is a timing diagram showing an example of the internal bus arbitration protocol according to the invention.

FIG. 6 is an example of a pipelined arbitration transaction between the CPU 16 and the DMAC 42 according to the invention.

Cycle 1: The CPU 16 requests the Bbus 14 by asserting cpureq.

Cycle 2: The arbiter 34 grants the Bbus to the CPU by asserting cpu_gnt.

Cycle 3: The CPU 16 acknowledges ownership of the Bbus and indicates the start of a write cycle by asserting a transaction signal for the duration of the transfer. The cpu_req signal remains asserted after being granted to indicate a back-to-back request. Because a request from the DMAC 42 (dma_req) is active, arbiter 34 degrants the CPU 16 and pregrants the DMAC 42 as soon as the transaction signal goes active. The bus pregrant notifies the DMAC 42 that it is master during the next bus cycle even though the Bbus is not currently available. The DMAC 42 gains access to the Bbus 16 at the end of the current bus cycle without making another dma_req. Thus, the number of dead cycles required to switch between bus masters is reduced.

Cycle 4: The CPU granted transaction proceeds (cpu g-transaction).

Cycle 5: The CPU transaction is completed and the transaction signal is deasserted by the CPU.

Cycle 6: The granted DMAC 42 takes over the bus and asserts the transaction signal. The arbiter 34 immediately degrants the DMAC and pregrants the CPU in similar fashion to cycle 3.

Cycle 7: Since the dma_req signal remains active, another bus master switchover is conducted between CPU 16 and DMAC 42 as described above in cycles 1-6.

Back-to-Back Arbitration Protocol

Figure 7:
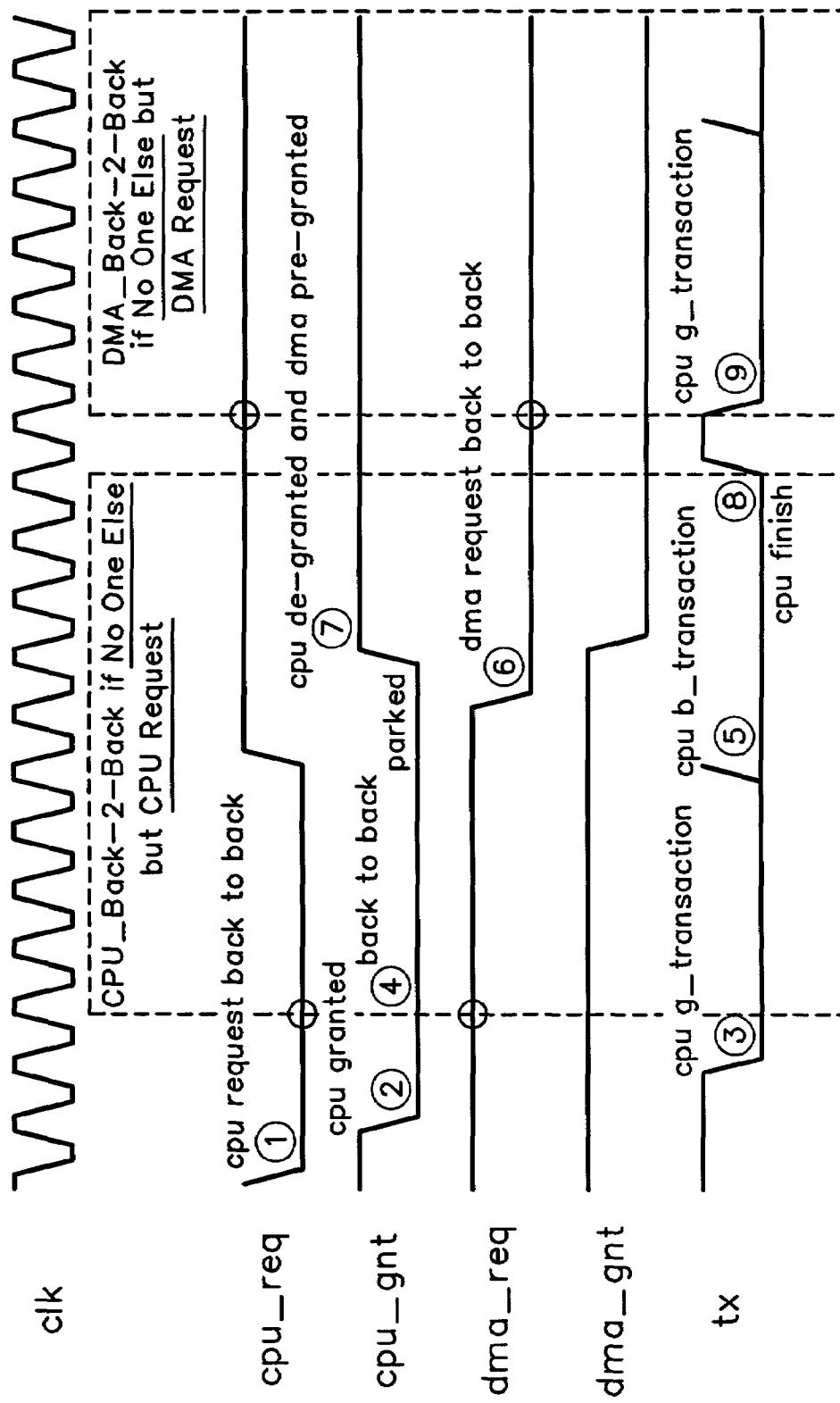
FIG. 7 is a timing diagram of an example of arbitration for a back-to-back transaction.

FIG. 7 is an example of a back-to-back arbitration protocol transaction conducted by arbiter 34 on the Bbus 14 between the CPU 16 and DMAC 42.

Cycle 1: The CPU 16 requests back-to-back Bbus transactions by asserting and keeping cpu_req asserted.

Cycle 2: The arbiter 34 grants the Bbus 14 to CPU 16 by asserting cpu_gnt.

Cycle 3: The CPU 16 acknowledges ownership of the Bbus 14 and indicates that it owns the bus by asserting the transaction signal.

Cycle 4: Since no other processing element is currently requesting the Bbus, the arbiter 34 grants the CPU 16 back-to-back transactions.

Cycle 5: CPU starts back-to-back transaction and deasserts the cpu_req signal. Since no other Bbus request exists, the arbiter parks on the CPU 16.

Cycle 6: The DMAC 42 asserts the dma_req signal while the Bbus is parked on the CPU 16.

Cycle 7: The arbiter 34 degrants the Bbus 14 to the CPU 16 and pregrants the Bbus 14 to the DMAC 42 which takes over in the next bus cycle.

Cycle 8: The CPU 16 releases the Bbus by deasserting the transaction signal. The DMAC 42 takes over in the next bus cycle.

Cycle 9: The DMAC 42 asserts the transaction signal while continuing to request a back-to-back Bbus transaction. The arbiter 34 continues to grant the DMAC 42 the Bbus as long as no other request is active.

Thus, router processing elements can continue to conduct bus transactions when no other processing element requests the Bbus.

Parking Arbitration Protocol

Figure 8:
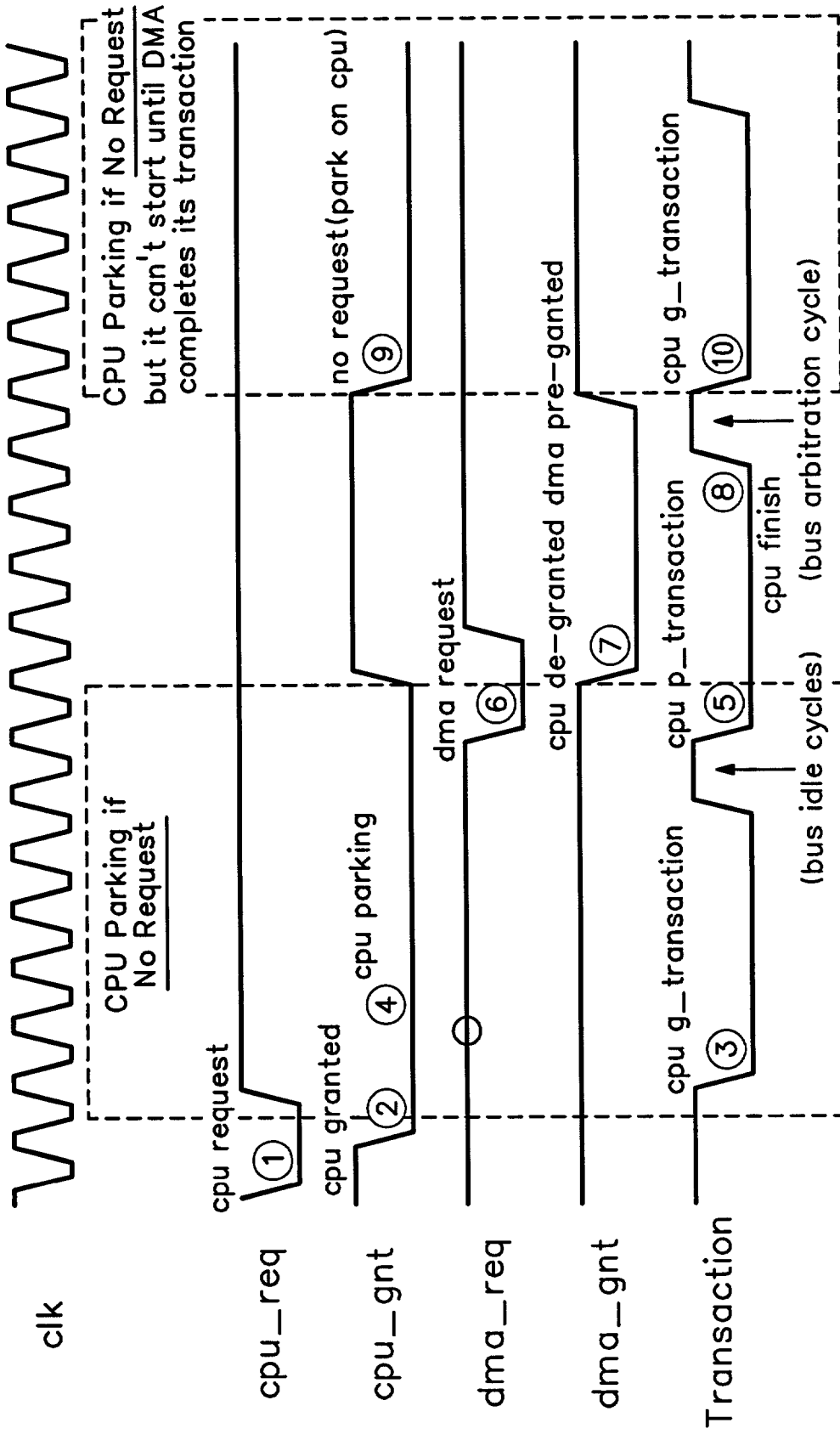
FIG. 8 is a timing diagram of an example of arbitration for a parking transaction.

FIG. 8 is an example of a parking transaction conducted on the Bbus 14 by arbiter 34 between the CPU 16 and the DMAC 42.

Cycle 1: The CPU 16 requests the Bbus 14.

Cycle 2: The CPU is granted a Bbus transaction by arbiter 34. No other processing element in the router requests the Bbus 16.

Cycle 3: The CPU 16 asserts the transaction signal.

Cycle 4: The arbiter 34 parks on the CPU 16.

Cycle 5: The CPU 16 starts a parked bus transaction without having to first request the Bbus.

Cycle 6: The DMAC 42 requests the Bbus 14.

Cycle 7: The arbiter 34 immediately degrants the CPU 16 and pregrants the DMAC.

Cycle 8: The CPU 16 completes a second bus transaction initiated while parked on the Bbus.

Cycle 9: Since there are no bus requests, the arbiter 34 parks on the CPU 16 after the DMAC 42 asserts the transaction signal and begins a transaction on the Bbus 16.

Cycle 10: The DMAC 42 takes over the bus. The CPU 16 cannot start a parked transaction until the DMAC 42 completes the bus transaction.

DRAM Controller

Figure 9:
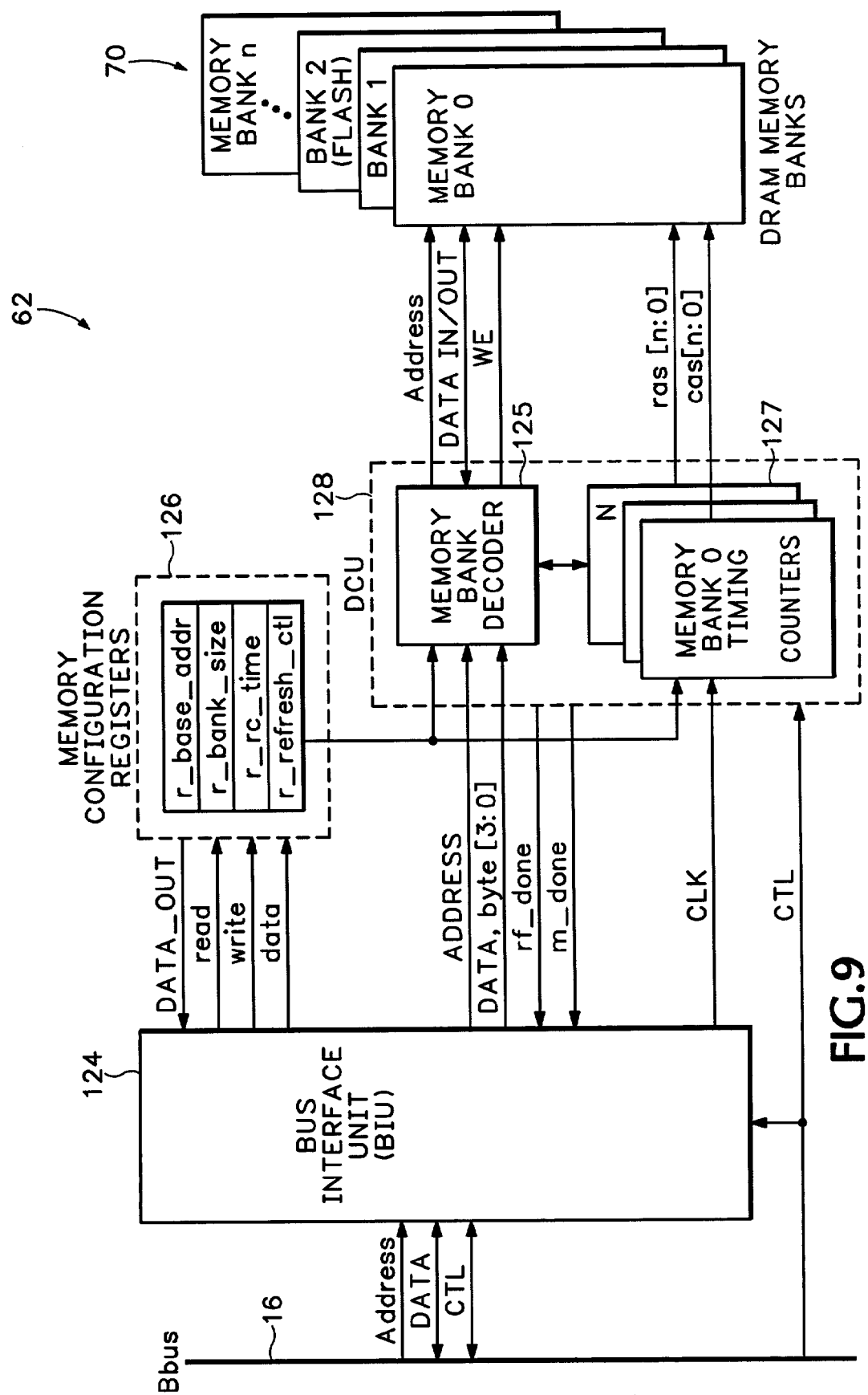
FIG. 9 is a detailed block diagram of the DRAM controller for the router shown in FIG. 1.

FIG. 9 is a detailed block diagram of the DRAM controller 62 shown in FIG. 1. The DRAM controller 62 (DRAM_CTL) controls multiple banks of memory 70 each having potentially different timing requirements and/or different sizes. A Bbus interface unit (BIU) 124 comprises a state machine that interfaces the Bbus 14 with a DRAM control unit (DCU) 128. The DCU 128 services DRAM refresh, register access, random memory access, burst memory access, retry and error handling. A set of configuration registers 126 are configurable for programming different memory block sizes and individually programming different timing for each configured memory block.

On a functional level, the DCU 128 includes a memory bank decoder 125 coupled to a memory bank timing circuit 127. The memory bank timing circuit 127 includes counters that are programmable through the configuration registers 126 for different DRAM RAS CAS timing and refresh cycles. DRAM_CTL 62 supports multiple banks of memory including both DRAM and Flash memory.

The configuration registers 126 include a base address register (r_base_address) that defines a base address value for address values at 1 Meg byte granularity. The bank size registers (r_bank_size) select 1 Mbyte, 4 Mbyte or 16 Mbyte bank sizes. The refresh control register (r_refresh_ctl) controls the ras on time t(RAS), the cas to ras delay time t(CRD) and the refresh period t(RF). The ras and cas time register (r_rc_time) controls the data available from cas transition times t(CAC), cas activation time t(CAS), cas precharge time t(CP), and the ras to cas delay time t(RCD).

Each bank of memory is individually configured via the r_bank_size register. The base address of each bank of memory is programmable via the r_base_addr register on a 1,4 or 16 Mbyte boundary. Thus, all banks of memory do not have to be the same size.

RAS and CAS Timing

The DCU 128 drives the ras and the cas lines at different rates and is configurable on a bank-by-bank basis with loadable counters 127 that decrement to zero before allowing a timing sequence to advance. The timing parameters are serialized as a timing stream. The DRAM controller 50 selects the appropriate ras line for an addressed memory block by comparing the incoming address lines to the r_base_addr register in combination with the r_bank_size registers.

Figure 10:
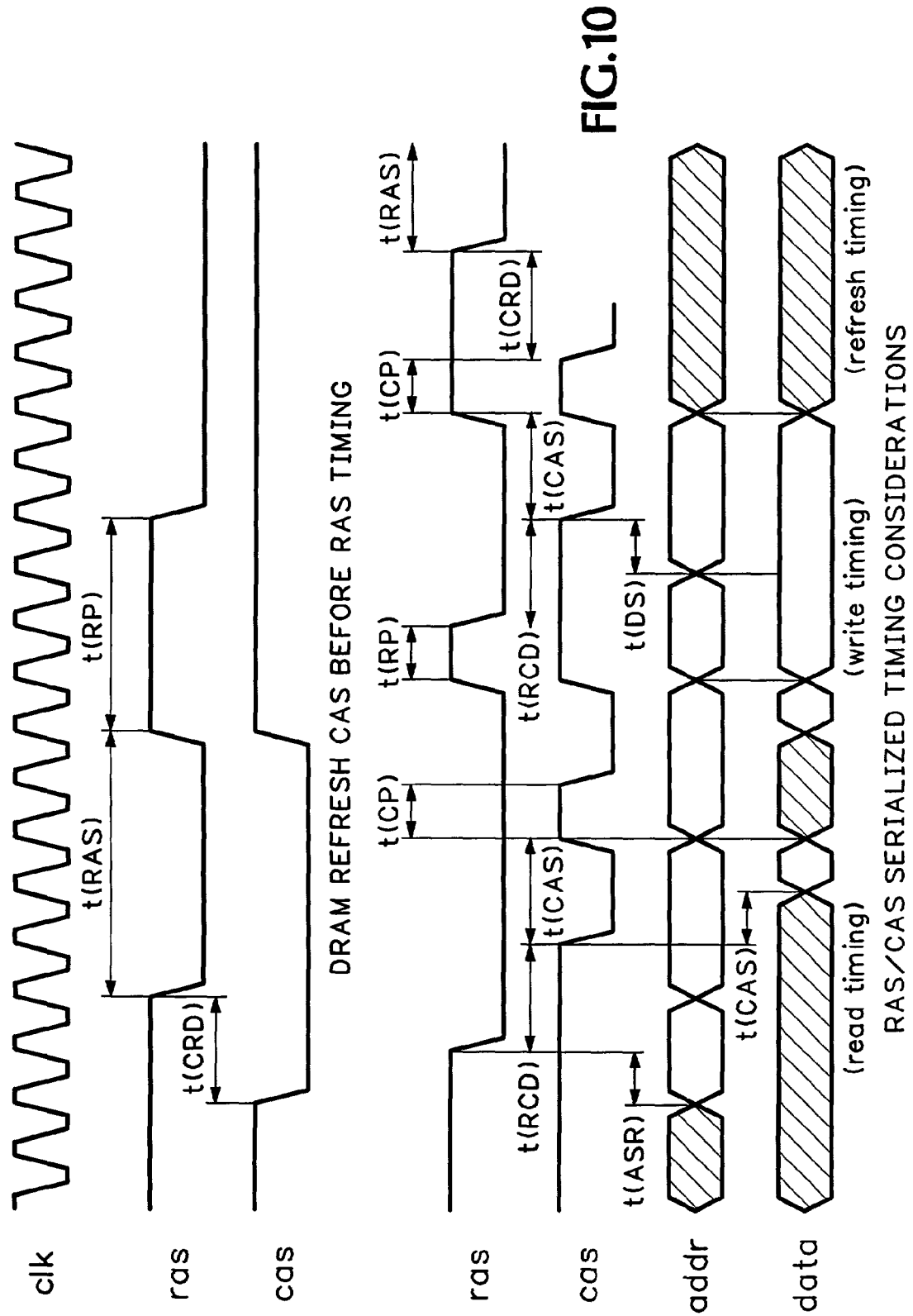
FIG. 10 is a timing diagram for the DRAM controller shown in FIG. 9.

FIG. 10 is a timing diagram illustrating the serialized timing relationship for a 25 nanosecond clock. Since the programmable times are on a cycle-by-cycle basis, the actual DRAM parameters are rounded up to the closest cycle and serialized for different memory types. The Row Address Setup Time to ras {t(ASR)} is not programmable. The ras to cas delay time {t(RCD)} is programmable from 1 to 4 clock delays at a 25 nsec clock cycle. The cas precharge time {t(CP)} is programmable from 1 to 4 clock delays at 25 nsec clock cycle. The cas active time {t(CAS)} is programmable from 1 to 4 clock delays at 25 nsec clock cycle. The data available from cas transition times {t(CAC)} is programmable from 1 to 4 clock delay at 25 nsec clock cycle. The cas to ras delay time {t(CRD)} is programmable from 1 to 4 clock delays at 25 nsec clocks. The ras on time {t(RAS)} is programmable from 1 to 16 clock delays at 25 nsec clocks.

The programmable DRAM controller 50 allows a wider variety of memory devices to be used together at the same time or separately with the router 12. Thus, different memory devices can be integrated into the router system. For example, faster more expensive memory devices can be selectively configured into time critical memory blocks used for time sensitive router applications.

Multi-Channel Circuitry

Of particular interest in the current invention is the multi-channel interface circuitry 18 shown in FIG. 1. The multi-channel circuitry is configurable to operate with a wider variety of data formats than existing router architectures. In addition, the DMAC 42 conducts a transaction protocol on the internal Bbus 14 that provides more efficient data packet transfers between the multi-channel circuitry 18 and other devices in the router, such as CPU 16.

Figure 11A:
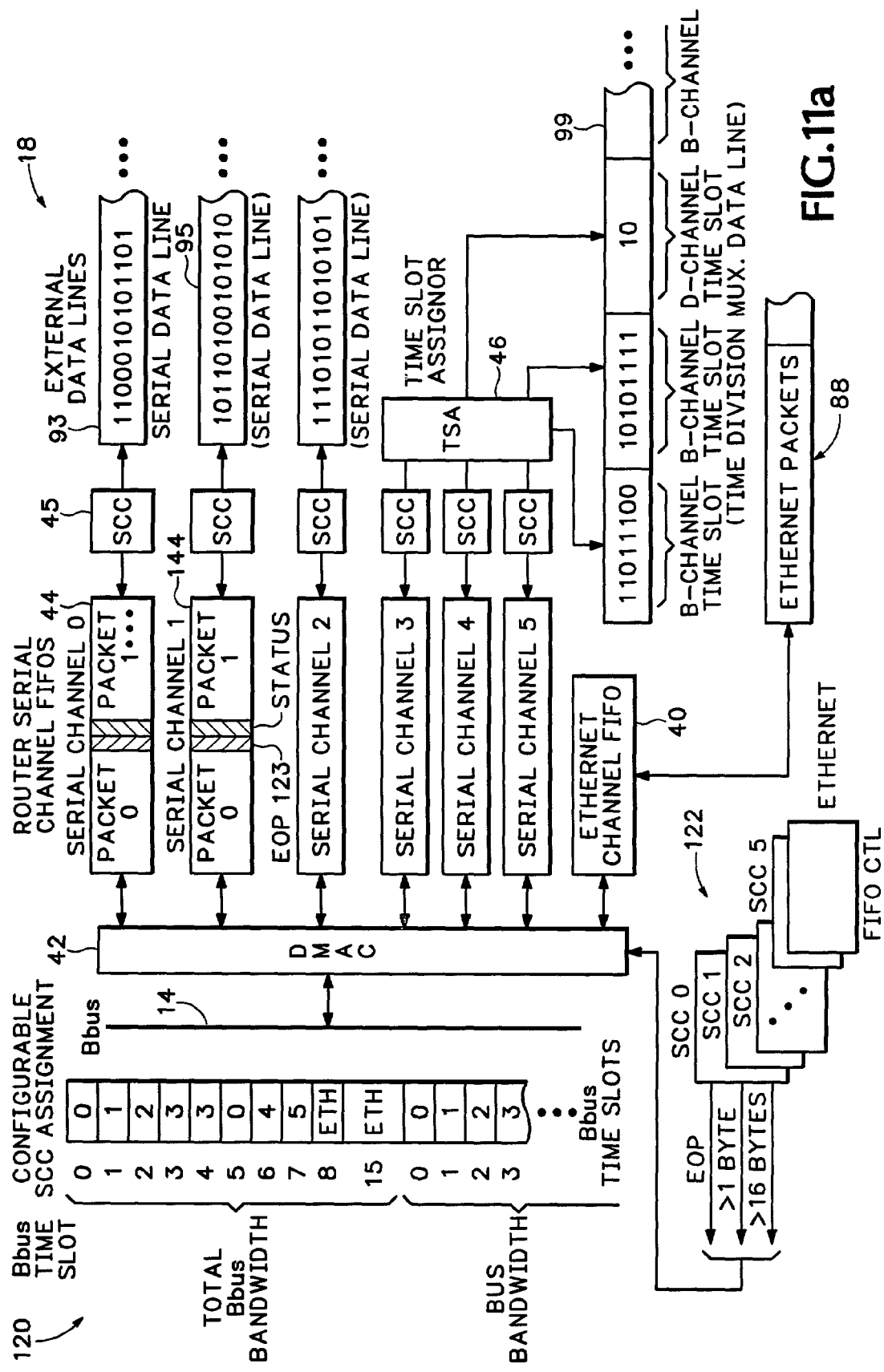
FIG. 11a is a detailed block diagram showing the flow for data packets received and transmitted on channels in the router shown in FIG. 1.

Referring to FIG. 11a, serial network data lines 92 and 96 (FIG. 3) transport serial data streams 93 and 95, respectively. The serial data streams comprise network data packets that are either transmitted or received by the router 12. The serial channels 44 serially read each data bit from serial data streams 92 and 96 in the same manner. A time division multiplexed network data line, such as ISDN line 98 (FIG. 3), carries a time division multiplexed (TDM) data stream 99. The TDM data stream 99 includes two B channel time slots and one D channel time slot.

Each time slot in the TDM data stream 99 carries network data packets for different messages. The data packets carried in the first B-channel are received and transmitted through the time slot assigner 46, SCC 45 and the FIFO for serial channel 5, the data packets carried in the second B-channel are received and transmitted on serial channel 4 and the data packets carried on the D-channel are received and transmitted from serial channel 3.

Serial channels 0-3 are configurable to operate as a straight serial channel through the SCC 45 and FIFO 44, such as shown by serial channels 0, 1 and 2. Alternatively, each serial channel is configurable to operate as a TDM serial channel through the TSA 45, SCC 45 and FIFO 44 such as shown with serial channels 3, 4 and 5. The three serial channels 0, 1 and 2 can be configured to support a second TDM data stream with a second time slot assigner at the same time that serial channels 3, 4 and 5 are processing TDM data stream 99. The router 12 includes two time slot assigner's for processing two TDM data streams at the same time.

Referring to FIG. 11b, the total available bus bandwidth for the Bbus 14 is divided into multiple time slots. During each time slot, the DMAC 42 can perform both a read and write bus transaction. Each read and write bus transaction is either a single word random access transaction or a burst transaction. Multiple words are transferred during read or write burst transactions. One word is transmitted between memory and the DMAC 42 during each bus cycle.

Referring to FIG. 12, the ISDN data stream 99 shown in FIG. 11a includes a first B-channel having 8 bits, a second B-channel having 8 bits and a D-channel having 2 bits. The ISDN data stream then repeats with the next 8 bits for the first B-channel. The TDM format can vary for different ISDN networks or for other TDM lines connected to router 12. For example, TDM data stream 101 represents another ISDN format that can be processed by router 12. While the B and D channels still carry 8 and 2 bits, respectively, each bit of the D-channel is interleaved between each one of the B-channels. The serial channels 44 and time slot assigner 46 are configurable not only to process serial and TDM data streams, but are also to process different TDM data stream formats such as shown in FIG. 12.

Referring back to FIG. 11a, transactions on the Bbus 14 can be bottlenecked due to the random nature in which data packets are received from different external networks. Any number of data packets can come into any of the serial channels at any time. Typically, when FIFOs in a router contain data packets, a DMAC requests control of an internal bus for DMA transmission to router memory. The internal bus bandwidth is used to gain access to the internal bus (dead band) and then transmit the data packets. However, if the bus transactions involve many small data transfers, a larger portion of the bus bandwidth is wasted in bus arbitration, configuration and administration tasks as opposed to actually transferring data. Conversely, if large data bursts are transferred during bus transactions, a larger portion of the bus bandwidth is used for transferring data packets.

Typically, a DMAC initiates bus requests based solely on a byte threshold. If a channel FIFO contains a minimum number of packet bytes, the DMAC then requests control of the internal bus. However, basing bus requests solely on data size can create latency problems. For example, a small number of bytes can remain in a FIFO for many bus cycles causing delayed processing by the router.

The DMAC 42 provides adjustable bandwidth allocation for each channel. The DMAC 42 can also reduce latency for channels that may transfer data at low speeds. Serial and Ethernet control 122 store information regarding the number of bytes contained in the FIFOs 44 for each serial channel and the Ethernet channel. The serial channels include an EOP bit that identifies the end of a data packet, a ">1 Byte" signal that indicates that the FIFO in the serial channel includes at least one byte from the end of a data packet and a ">16 byte" signal that indicates that the FIFO in the serial channel includes at least 16 bytes from the end of a data packet.

The bus allocation is done by dividing the total bus bandwidth into 16 "time slots", 0-15. Each time slot is assigned to a particular channel. More than one time slot can be assigned to the same channel. In one embodiment shown in FIG. 11a, there are 7 channels: 1 Ethernet and 6 serial channels. The DMAC 42 services the channel assigned to each time slot in order: 0-15, 0-15, etc.

When a time slot is serviced, the channel assigned to that time slot can perform 1 Bbus read transaction and 1 Bbus write transaction. If the channel is not prepared for either the read, the write or both transactions, the DMAC quickly advances to next transaction (or possibly the next channel).

In one configuration, the DMAC 42 is configured as follows:

| Time Slot | Channel |
|---|---|
| 0 | serial0 |
| 1 | serial1 |
| 2 | serial2 |
| 3 | serial3 |
| 4 | serial3 |
| 5 | serial0 |
| 6 | serial4 |
| 7 | serial5 |
| 8-15 | ethernet |

In the example, if all channels have data to transfer, the Ethernet channel can use at most 50% of the total available bus bandwidth (8 out of 16 slots), serial0 and serial3 each get a maximum of 12.5% (2 out of 16), and serial1, serial2, serial4 and serial5 each get 6.25% (1 out of 16).

The maximum latency is as follows: serial0 could have to wait a maximum of 10 time slots to be serviced (from slot 5 to slot 0) and a minimum of 5 time slots. The Ethernet channel will wait of minimum of 0 time slots most of the time, but could wait a maximum of 8 time slots much less frequently. If a channel does not have data to be DMA transferred by the time that the channel's slot is due to be serviced, the DMAC can quickly advance to the next time slot. This keeps the maximum overhead of the DMA to a minimum.

A channel can be assigned more bandwidth even if the expected data rate on the channel is low. For example, data received from a keyboard terminal has a relatively low data rate. However, the required latency for responding to the keyboard inputs is relatively short. Thus, data on a channel that requires quick router response can be assigned more than one time slot or assigned time slots which are distributed throughout the Bbus bandwidth. For example, a channel can be assigned a beginning, middle and ending time slot during the total bandwidth period. Therefore, if a channel is assigned multiple time slots and the amount of data transferred over the channel is small, bandwidth on the Bbus 14 is not significantly affected.

Figure 13:
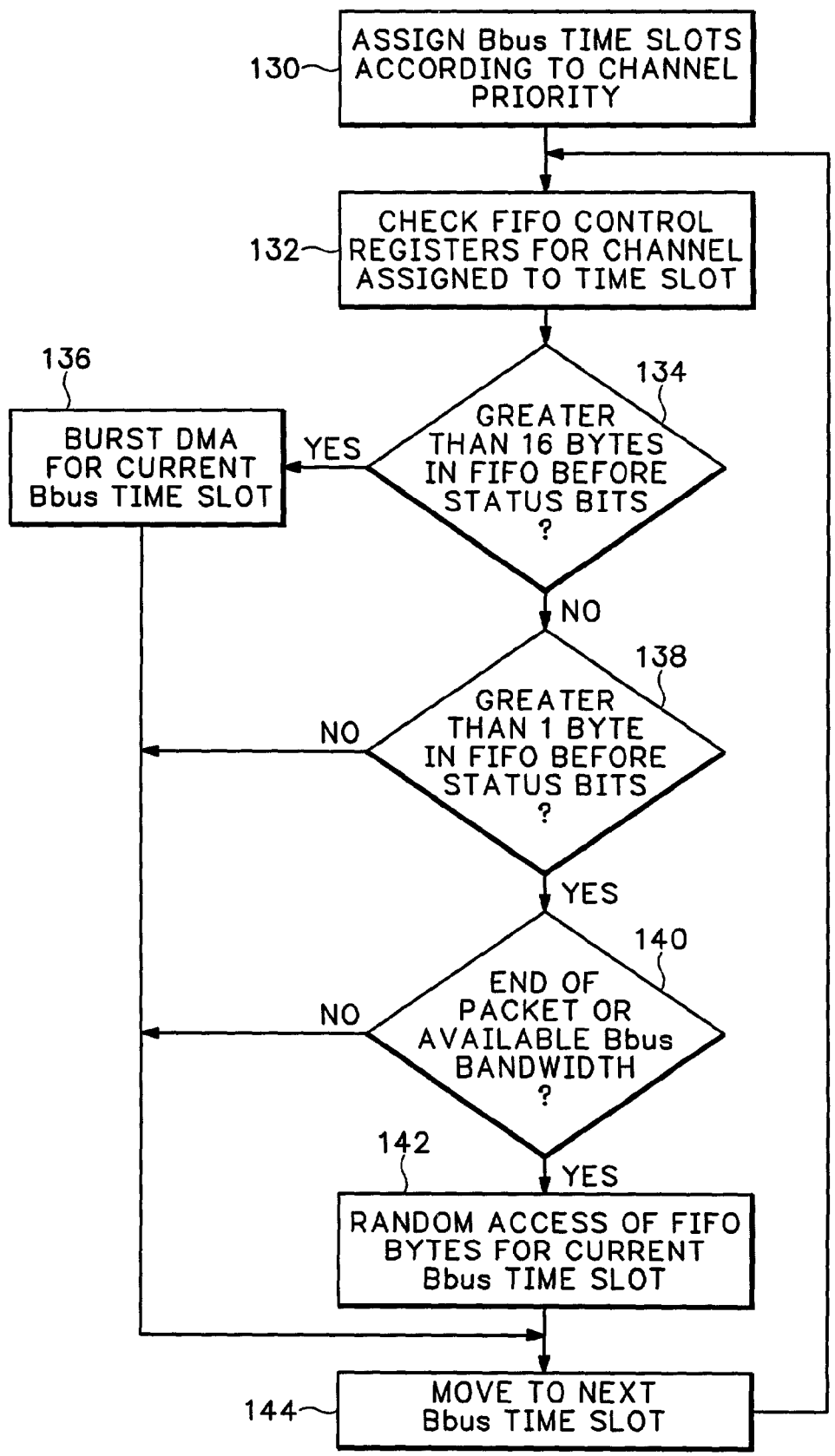
FIG. 13 is a step diagram showing how internal bus transaction priority is assigned in the router.

Referring to FIG. 13, the DMAC 42 is first configured through time slot assignment registers to map active channels to any of the 16 available Bbus time slots in step 130. Step 132 checks the FIFO control registers 122 for the channel assigned to the current time slot. Decision step 134 determines whether the FIFOs contain more than 16 bytes before any FIFO end of packet status bits. If there are more than 16 bytes, step 136 conducts a 16 byte packet burst transfer over the Bbus 14. The DMAC 42 then processes data for the channel in the next time slot in step 144 and returns to step 132.

If the FIFO contains less then 16 bytes of packet data, decision step 138 determines whether there is at least one byte of packet data in the FIFO before a FIFO status bit. If there are no bytes in the FIFO for the channel, the DMAC moves to the next time slot in step 144 and then returns to step 132. If there is more then one byte in the channel FIFO but less than 16 bytes, decision step 140 determines whether there is an end of packet (EOP) at the end of the byte stream. An EOP provides a higher level of priority since no additional data is required to begin processing the packet header for routing purposes. Thus, if the EOP is identified in decision step 140, step 142 conducts a random access data transfer.

Decision step 140 may also transfer less than 16 bytes of packet data over the Bbus 14 based on other bandwidth criteria. For example, if bandwidth is available on the Bbus, the DMAC 42 may conduct a random access from the FIFO regardless of whether an EOP is present. Bandwidth availability is determined, for example, when the FIFO data is present for more than a predetermined time period. Signals from the FIFO control 122 allow the DMAC 42 to request Bbus transactions that increase the proportion of the Bbus bandwidth used for data packet transmission while at the same time providing selectable time slot assignments that reduce router latency.

Figure 14:
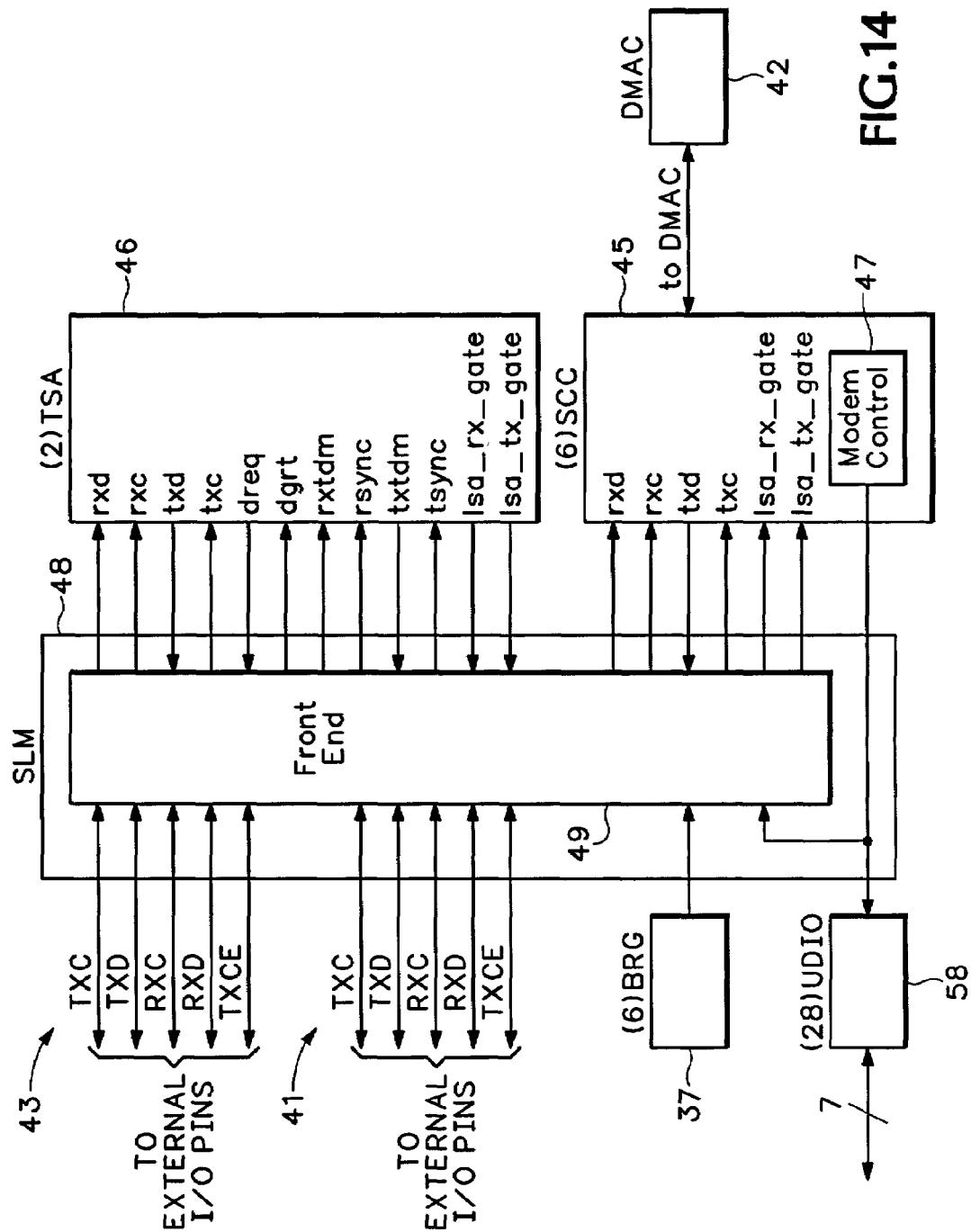
FIG. 14 is a detailed block diagram of a serial line multiplexer for the router shown in FIG. 1.

FIG. 14 is a detailed diagram of the serial line multiplexer (SLM) 48 shown in FIG. 1. The SLM 48 includes a front end control circuit 49 that routes signals from external pins either to the time slot assigners (TSAs) 46 or directly into the SCCs 45. The TSAs 46 are used to disassemble data packets located in different time slots in a multiplexed data stream to different SCCs 45. A first set of external lines 43 include transmit data (TXD), transmit clock (TXC), receive data (RXD), receive clock (RXC) and transmit enable lines. A baud rate generator 37 is coupled to the SLM 48.

If the external lines 43 contain time division multiplexed data packets (e.g., ISDN interface), the signals are routed by the SLM 48 to the TSAs 46. The TSAs then route the disassembled TDM data packets back through the SLM 48 to the appropriate SCCs 45. If a set of external data lines 41 carries an unmultiplexed serial data stream, the SLM 48 routes the signals directly to the appropriate one of four of the six SCCs 45.

For transmit, the SLM 48 routes data packets from the SCCs 45 to the appropriate external line. If the external line carries a TDM data stream, the SLM 48 routes the data packets for the appropriate SCCs through the TSAs 46. The TSA multiplexes the data packets for the multiple serial channels into one data stream that is fed back into the SLM 48 and routed to the appropriate external I/O pins. If an external line carries a straight serial data stream, the SLM 48 routes the output from one of the SCCs to the appropriate external I/O pins. The UDIO's 58 are configurable to be used as modem control inputs and outputs, or as ISDN TDM control signals.

Figure 15:
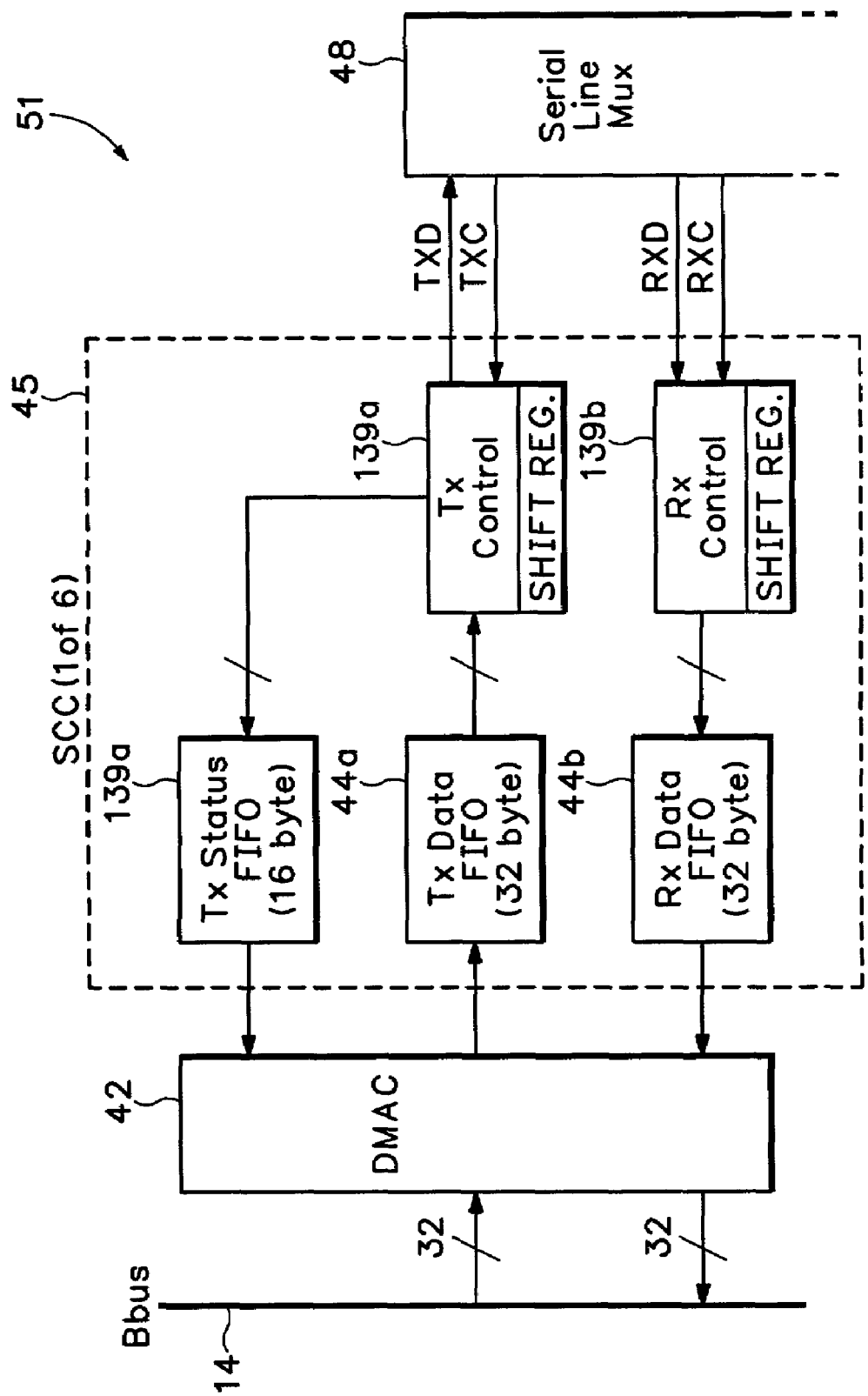
FIG. 15 is a detailed block diagram of a serial channel for the router shown in FIG. 1.

FIG. 15 is a detailed diagram for one of the serial channels 44/45 shown in FIG. 1. There are six separate SCCs 45. Each SCC 45 includes a receive channel including a receive data link controller (Rx Control) 139b and a receive data FIFO 44b. The transmit channel in each SCC 45 includes a transmit controller (Tx Control) 139a and a transmit data FIFO 44a. The transmit and receive channels can concurrently transfer data. All six SCCs 45 are coupled between the SLM 48 and the DMAC 42.

The Rx controller 139b includes a serial-to-parallel shift register and multiple control registers. The serial-to-parallel shift register is programmable via a data format control register to treat the first received bit as either the most significant bit or the least significant bit in a received serial input stream. The parallel data is then transferred to the Rx Data FIFO 44B. Similarly, the Tx controller 139b is programmable via a data format control register to convert parallel data from the Tx data FIFO 44a into a serial data stream with either the least significant bit transferred first or the most significant bit transferred first. The most significant bit (MSB) first or least significant bit (LSB) first programmability allows any necessary bit swapping of data bytes to be performed on-the-fly. Thus, the CPU-intensive task or bit swapping is performed either while packet data is transferred into memory from a router interface, or as data is moved from memory to the interface.

The Tx and Rx FIFOs 44 are each nine bits wide for storing eight data bits of packet data and one EOP bit. The EOP bit is used to identify the tail-end of one packet and the start of another packet located in the Rx FIFOs 44 as described in FIGS. 11a and 13. A burst transfer may overrun the end of the current packet and into the beginning of the next packet. Thus, the EOP bit identifies when random access transfers should be performed by the DMAC 42.

A Tx status FIFO 139a is used to associate status from the interface SCCs on the termination of packet transmission with the appropriate buffer descriptor. After the DMAC 42 has loaded the last data byte of a transmit packet into the Tx Data FIFO 44, it will load the last buffer descriptor address (LBDA) of the buffer descriptor into the FIFO. The four bytes of the LBDA will be designated by the EOP bit being set for each byte. When the SCC reads the LBDA from the Tx Data FIFO, it will write the LBDA into the Tx Status FIFO, followed by four bytes of interface status.

Time Slot Assigner

Figure 16:
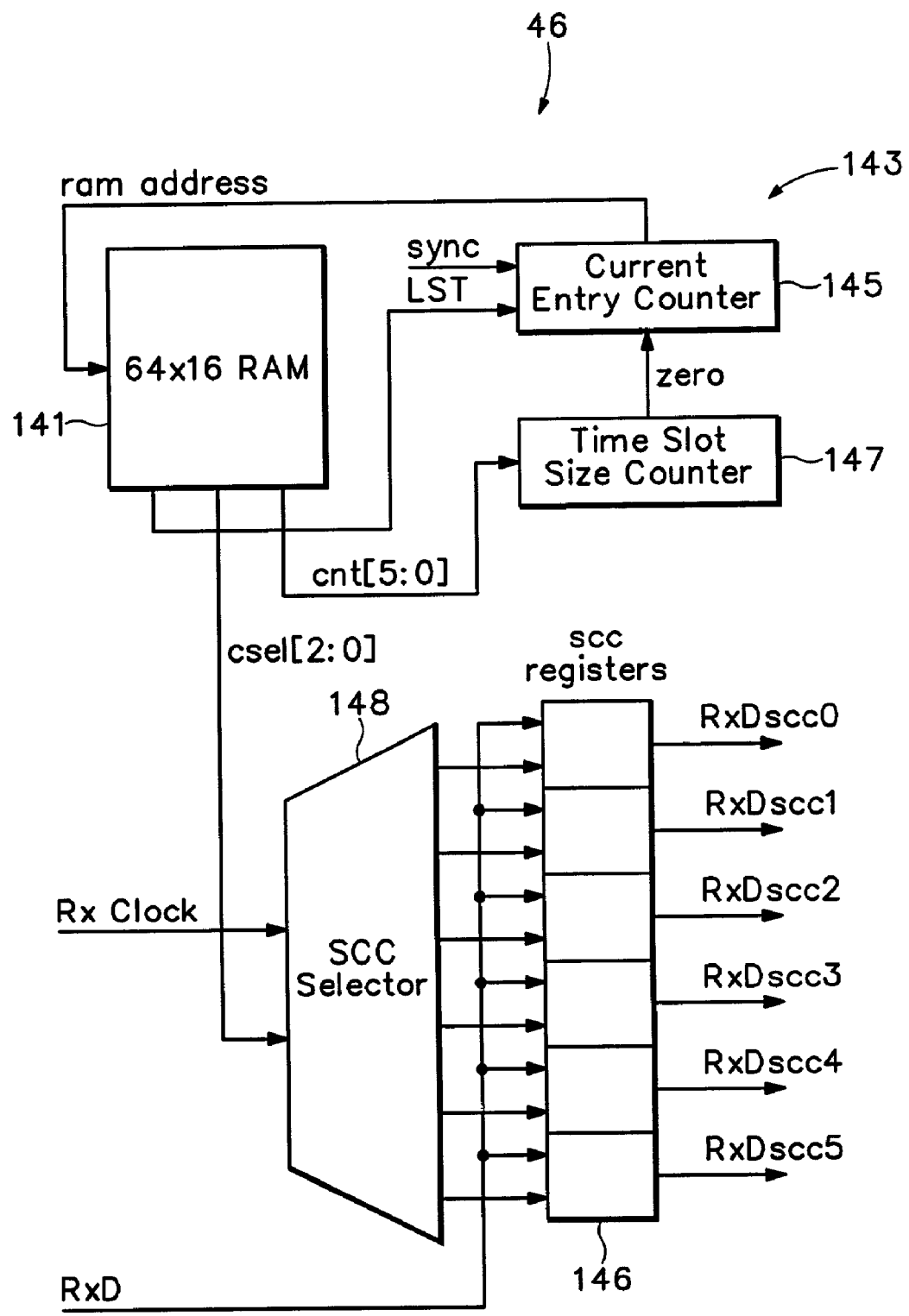
FIG. 16 is a detailed block diagram of a time slot assigner receive circuit for the router shown in FIG. 1.
Figure 17:
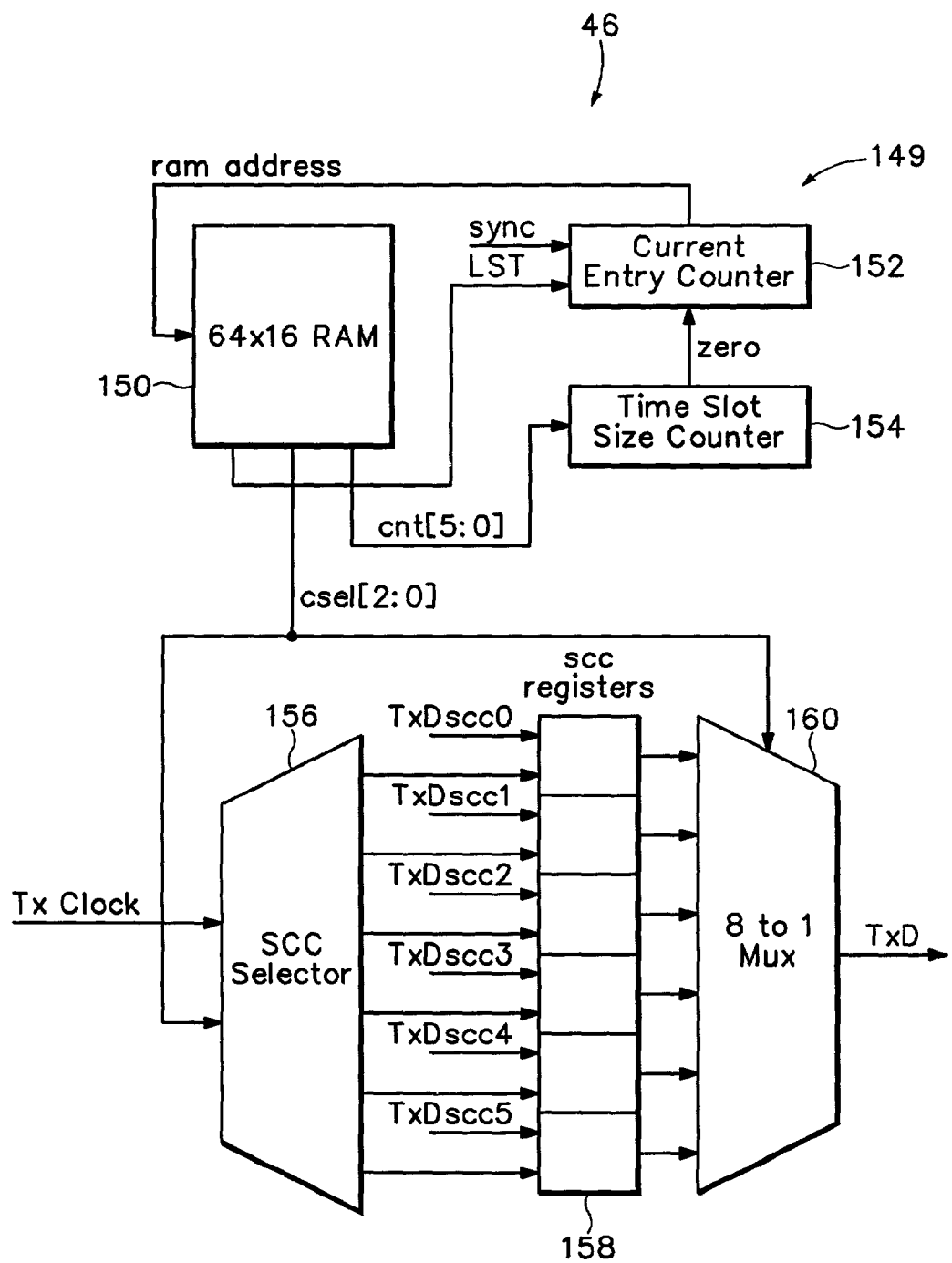
FIG. 17 is a detailed block diagram of a time slot assigner transmit circuit for the router shown in FIG. 1.

FIG. 16 is a detailed diagram of receive circuitry 143 and FIG. 17 is a detailed diagram of transmit circuitry 149 for the TSA 46 (FIG. 1). The receive circuitry 143 includes a RAM 14 coupled via a LST signal to a current entry counter 145 and coupled via CNT lines to a slot size counter 147. The slot size counter 147 generates a zero signal to the current entry counter 145 and the current entry counter 145 generates an address for RAM 141. A selector 148 receives channel selector signals CSEL from the RAM 141 along with the receive clock from an external line.

Registers 146 associated with each SCC 45 are coupled at their inputs to the outputs from selector 148 and to a receive data line RxD carrying a TDM data stream (e.g., ISDN). The transmit circuit 149 is similar to the receive circuit 143 and includes a RAM 150, current entry counter 152 and slot size counter 154. A selector 156 coupled to the transmit clock Tx from the external line and the channel select signal CSEL. The selector 156 output and the transmit data from the SCCs feed registers 158. A multiplexer 160 is coupled at the input to the output for registers 158 and outputs a TDM transmit signal to an external I/O pin.

The TSA 46 assembles and disassembles time division multiplexed (TDM) frames by time slot assignment as described above in FIG. 11a. The TSA 46 identifies the beginning of a packet by a sync pulse SYNC and a clock signal RXC generated through the SLM 48 according to signals on the external line. The SCC routing information for each time slot is preprogrammed in the dual port RAMs 141 and 150. The current entry counters 145 and 152 generate the addresses for the RAMs 141 and 150, respectively. When the SYNC pulse is asserted, the counter 145 or 152 is cleared to 0. Depending whether there is a receive or transmit operation, the appropriate time slot size counter 147 or 154 count down to 0 from the number indicated in CNT, and in the same clock cycle, the associated current entry counter 145 or 152 is incremented by 1.

Figure 18:
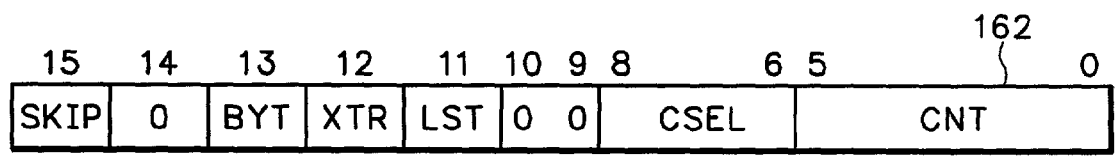
FIG. 18 is a diagram showing an entry in the time slot assigner memory.

The format for entries in the RAMS 141 and 150 are shown in FIG. 18 and include a CNT field that equals the number of bits or bytes transferred in the time slot. A channel select field CSEL encodes the SCC channel where the bits are routed as follows:

000: route to SCC0
001: route to SCC1
010: routetoSCC2
011: routetoSCC3
100: route to SCC4
101: route to SCC5
110: reserved
110: reserved A LST field identifies the last entry in the RAM. After this entry, the next SYNC pulse resets the current entry counter to zero and the first entry in the RAM. A XTR field is used in special situations where the user wants to receive data from a transmit pin 50 or transmit data onto a receive pin 50. A BYT field is used for bit resolution indicating whether the CNT value indicates the number of bits or the number of bytes in a time slot. A SKIP field directs the TSA 46 to skip data transfer to/from the selected serial channel for the duration indicated by CNT. The SKIP field causes the Tx data to go into a high impedance state and causes the Rx data to be ignored.

Time Slot Receive Operation

The TSA 46 conducts a TDM receive operation in the following manner.

1. A SYNC pulse is generated by the SLM 48 and the current entry counter 145 is cleared to zero.
2. The counter 145 addresses the first entry of RAM 141.
3. The channel select bits CSEL from current entry of RAM 141 are decoded by the selector 148 and the time slot size counter 147 is loaded with the value in the CNT field of register 162 from RAM 141.
4. At each clock cycle generated by the external TDM line, the bits received from the TDM time slot are shifted into the SCC register 146 indicated in the CSEL field. The time slot size counter 147 is then decremented by 1.
5. When the time slot size counter 147 reaches zero and if LST is not set, the current entry counter 145 is incremented by 1 enabling a read from the next entry in RAM 141. The receive process then jumps back to step 3.
6. If LST is set when the time slot size counter 147 counts to zero, the current entry counter 145 is cleared to zero and the first entry of RAM 141 is selected. The TSA receive circuitry 143 waits for the next SYNC pulse to start transferring data packets for the next frame.

Time Slot Transmit Operation

The TSA transmit circuitry 149 conducts a transmit operation from the SCCs 45 to external pin coupled to a TDM data line in the following manner.

1. When a sync pulse is detected, the current entry counter 152 is cleared.
2. The first entry in RAM 150 is read by the counter 154, selector 156 and multiplexer 160.
3. The selector 156 and the multiplexer 160 decode the channel select bits CSEL. The slot size counter 154 is loaded with the value in the CNT field of register 162 from current entry of RAM 150.
4. For each clock cycle, a data bit TxD is shifted out one of the selected channel registers 158 through multiplexer 160 forming a TDM data stream TxD. The time slot size counter 154 is decremented by 1 each clock cycle.
5. When the time slot size counter 154 reaches zero and the LST bit is not set, the current entry counter 152 is incremented by 1. The next entry in RAM 150 is then read and the transmit operation jumps back to step 3.
6. When the time slot size counter 154 counts to zero and the LST bit is set, the current entry counter 152 is cleared to zero. The TSA transmit circuitry 149 then waits for the next SYNC pulse to start transferring a new frame.

By loading different entries into RAMs 141 and 150, the TSA 46 can be programmed to disassemble and assemble TDM data streams having different formats loaded into different serial channels 45. Thus, the TSA 46 allows the router 12 to interface to different external network lines using different data protocols.

Ethernet and Serial Channel DMA Controller

Figure 19:
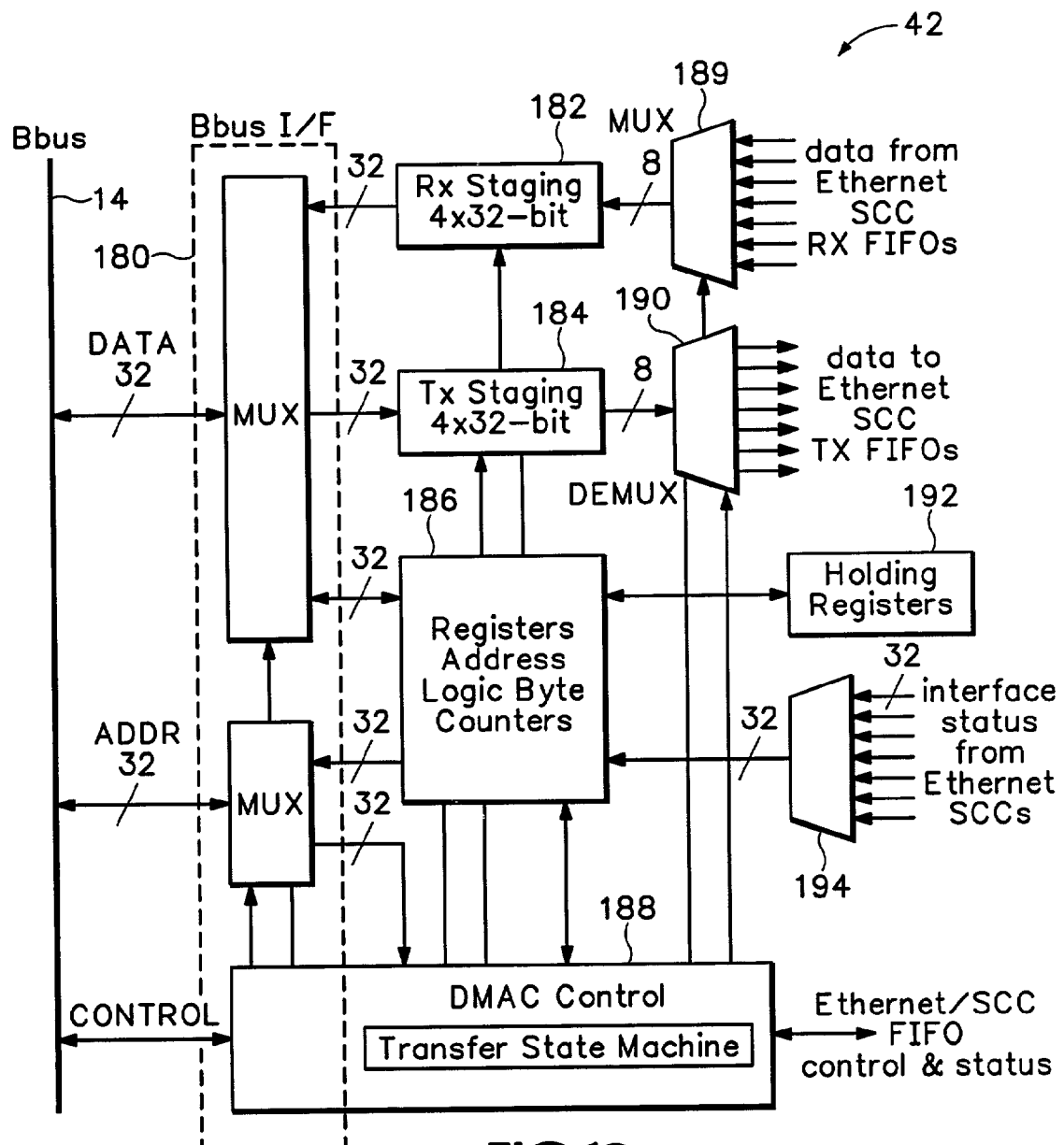
FIG. 19 is a detailed block diagram of a direct memory access controller for the router shown in FIG. 1.

FIG. 19 is a detailed diagram of the direct memory access controller (DMAC) 42 previously shown in FIG. 1. The DMAC 42 includes a Bbus interface circuit (Bbus I/F) 180 coupled to the Bbus 14 and a channel multiplexer 189 coupled to the bus interface circuit 180 through an RX staging circuit 182. Multiplexer 189 receives data from both the Ethernet channel 40 (FIG. 1) and the receive paths for each one of the six serial channels 45. A transmit staging register 184 is coupled between the interface circuit 180 and a channel selector 190. The channel selector 190 is a demultiplexer that selectively transmits data packets to either the Ethernet channel 40 or to the transmit FIFOs 44 in the transmit path for any one of the six serial channels 45. Multiple registers, address logic and byte counters 186 are coupled between the I/F circuit 180 and a channel status multiplexer 194 and holding registers 192. The multiplexer 194 receives interface status signals from the Ethernet channel 40 and the six SCCs 45. DMAC control logic 188 is coupled to all elements in the DMAC 42 for controlling DMA transactions on the Bbus 14. The registers 186 and 192 are shown in detail in FIG. 23.

Figure 21:
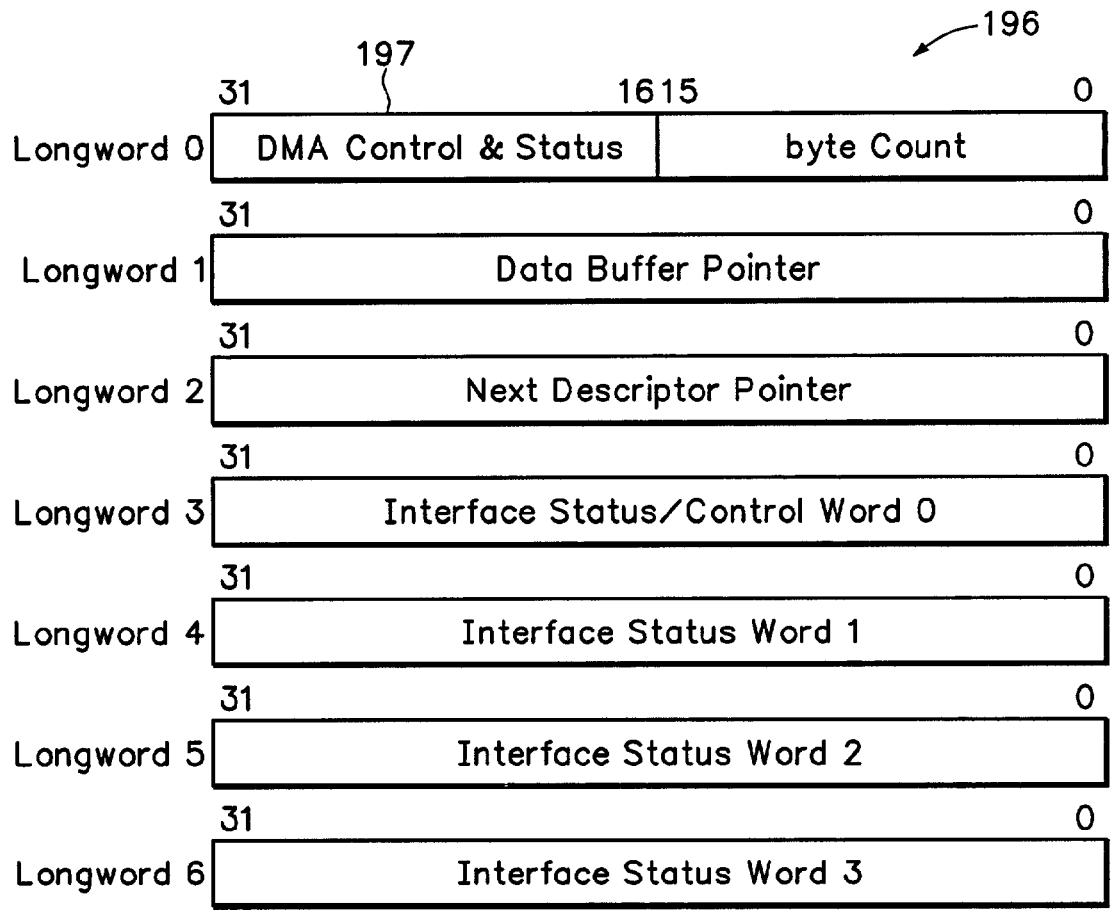
FIG. 21 is a diagram showing fields in a buffer descriptor.

The DMAC 42 supports seven transmit and seven receive channels which include Ethernet channel 40 and the 6 serial channels 45. The DMAC 42 is capable of transferring a single contiguous block of data between FIFOs in the Ethernet channel 40 or the SCC channels 45 and the Bbus 14. The DMAC 42 is globally controlled through registers 186 and individual packet DMA is controlled via descriptors that reside in memory 70 (FIG. 21). The global control registers, for example, enable and disable DMA for each channel interface, enable interrupts, reset the DMAC, set the size of data buffers to be used for packet reception and assign time slots to different Ethernet and serial channels that allocate and prioritize Bbus transactions (FIG. 11a).

The DMAC 42 can begin and end DMA transfers of packet data on any arbitrary byte boundary. Supporting non-aligned block transfers of packet data avoids requiring the CPU to perform the time-consuming re-alignment of the packet data to boundaries imposed by a DMA controller.

The DMAC 42 can also transfer data to and from memory in either ascending or descending address locations. This allows the DMAC and SCCs to perform any necessary bit swapping of data bytes on-the-fly. Thus, this CPU-intensive task can be handled either as packet data is transferred into memory from an interface, or as data is moved from memory to the interface. This feature provides the router 12 with equal efficiency when translating between protocols that use opposite bit ordering or translating between protocols that use the same bit ordering.

Tx and Rx Staging Registers

The staging registers 182 and 184 allow the DMAC 42 to perform Bbus bursts whenever possible, performs byte-to-word and word-to-byte conversions to and from the Ethernet and SCC data FIFOs, and aligns the DMA with arbitrary byte boundaries. The separate Rx and Tx staging registers 182 and 184, respectively, allow data transfers between the Bbus and the transmit and receive channel FIFOs at the same time.

Figure 20:
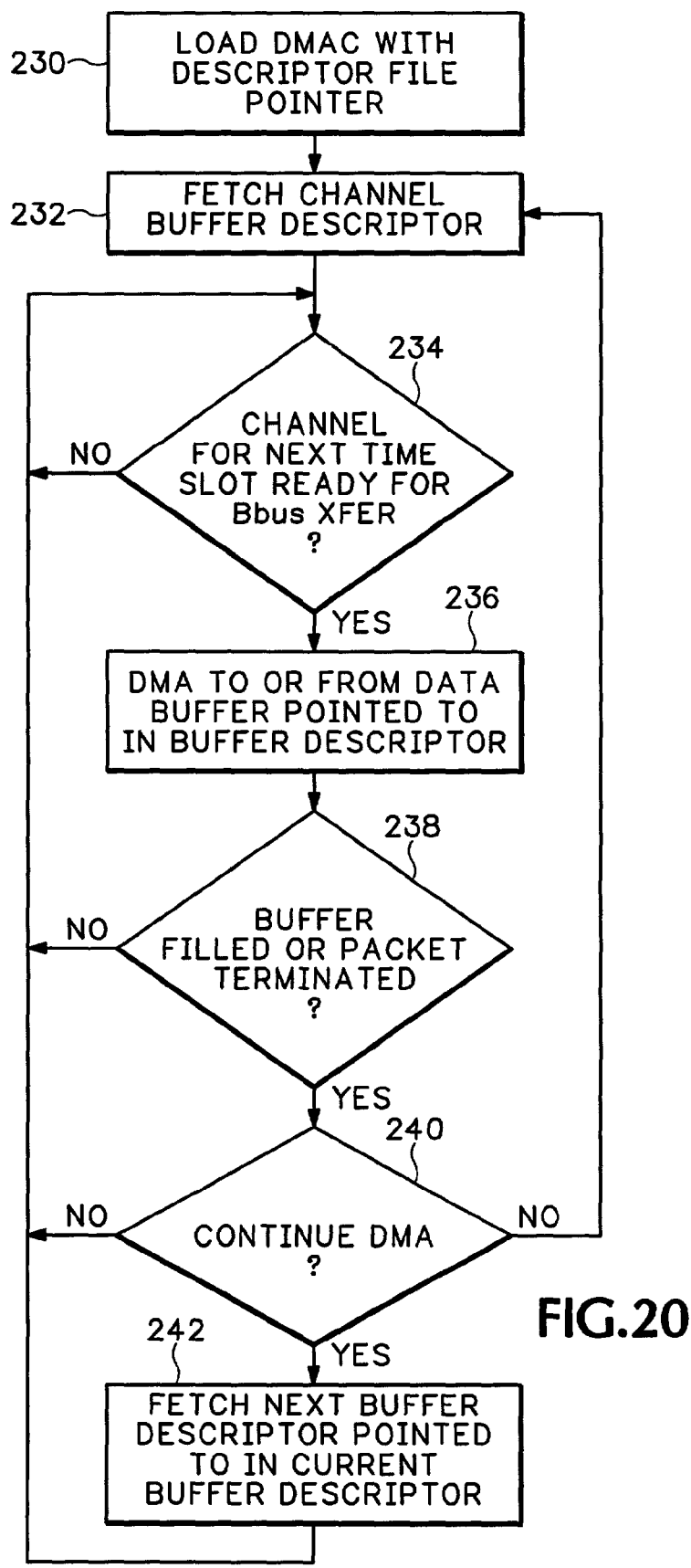
FIG. 20 is a step diagram showing how the direct memory access controller conducts internal bus transactions.

FIG. 20 is a step diagram showing how the DMA 42 conducts DMA transactions. The DMAC 42 is loaded with pointers to descriptor files in memory 70 in step 230. Step 232 then fetches the buffer descriptor associated with the channel data packet. The buffer descriptor contains interface status data, DMA control data and pointers to both a data buffer and the next buffer descriptor.

Decision step 234 determines whether the channel associated with the Bbus time slot is ready for a Bbus transfer. If the channel does not contain packet data, the DMAC 42 moves to the channel associated with the next time slot. If the channel is ready to either receive or transmit data packets, step 236 begins a DMA to or from a data buffer in memory 70. The data buffer is located with the data buffer pointer in the buffer descriptor. Decision step 238 continues to write or read from the data buffer until the buffer is filled or the packet is terminated. Decision step 240 determines whether to continue the DMA transfer based on different criteria such as the number of bytes transferred. If the DMA session continues, the next buffer descriptor is fetched by the DMAC 42 in step 242. A pointer to the next buffer descriptor is loaded when the current buffer descriptor was fetched.

The DMAC 42 DMAs packet bytes to or from the next data buffer. The next data buffer is located by a pointer in the newly fetched buffer descriptor. If the DMA has completed or the maximum DMA byte size has been reached, the DMAC 42 stops the DMA session and checks for a DMA request from the channel assigned to the next Bbus time slot in step 232. The DMAC 42 fetches the buffer descriptor for the next channel and conducts another DMA session.

Bbus Access Control

As described above in FIG. 11a, access to the Bbus 14 is divided into 16 time slots, and each slot can be assigned to any of the seven channel interfaces. Each time slot allows the selected interface to perform one Bbus transfer for receive and one Bbus transfer for transmit. The assignments are made by loading the interface number into one of the registers 186 (FIG. 19).

RDMAC Control and Status

The DMAC control logic 188 and 186 conducts receive direct memory access control (RDMAC) and transmit direct memory access control (TDMAC). Each RDMAC is controlled via a control and status register (CSR). Each RDMAC is enabled to DMA packets to memory 70 when an enable bit is set in the CSR. Setting the enable bit causes the RDMAC to fetch the descriptor pointed to by the value in the current descriptor pointer register. An address decrement bit causes the RDMAC to decrement rather than increment the current address counter during a DMA.

TDMAC Control and Status

The TDMAC is controlled with the control and status registers (CSR). Each TDMAC is enabled to DMA packets from memory when the enable bit is set. Setting the enable bit causes the TDMAC to fetch the descriptor pointed to by the value in the current descriptor pointer register. If the enable bit is cleared while the TDMAC is DMAing a packet from memory, the current DMA of the packet is stopped. The buffer descriptor status will be updated after the packet transmission out of the interface terminates. Setting an address decrement bit will cause the TDMAC to decrement the current address during a DMA.

The TDMAC will begin transmission of the next packet if the enable bit is still set. The TDMAC will advance through the buffer descriptors until it finds the last buffer of the packet as indicated by the DMA control and status field in the buffer descriptor. The TDMAC must own each buffer in order to advance to the next buffer. If the TDMAC advances to a buffer that it does not own, the DMA is stopped.

Buffer Descriptors

FIG. 21 is a diagram showing the fields in a buffer descriptor 196. The buffer descriptor 196 controls transmission and reception of individual packets by the DMAC 42. Each Tx interface provides to the DMAC 42 a signal that tells the DMAC how many bytes of interface status that particular interface will provide. Each Rx interface asserts the EOP bit in the Rx FIFO for the duration of the Rx interface status, so the DMAC 42 knows how many interface status words it is receiving.

A Byte Count Field in buffer descriptor 196 is set by the CPU 16 to indicate the number of bytes in a transmitted buffer. For DMA receive, the Byte Count Field is written by the RDMAC after the DMA to a memory buffer terminates. The Byte Count Field is loaded (indirectly) with the amount of data written to the buffer. When a RDMAC reads a buffer descriptor, it ignores the Byte Count Field and uses the value in an Rx buffer size register.

The Interface Status/Control Field in the buffer descriptor 196 indicates the state of the interface logic after termination of the DMA session. The Interface Status/Control field is also used by the CPU 16 to control the behavior of the Tx interface after the end of a packet has been DMAed. The format of the interface status field varies depending on the type of interface (Ethernet, Serial) associated with the channel.

The Data Buffer Pointer is the start address of the data buffer holding a data packet. There are no alignment restrictions; the buffer can start on any byte boundary. This value is loaded into the current address counter register when the DMAC 42 reads the descriptor 196. The Next Descriptor Pointer is the address of the Longword 0 of the next buffer descriptor 196.

Figure 22:
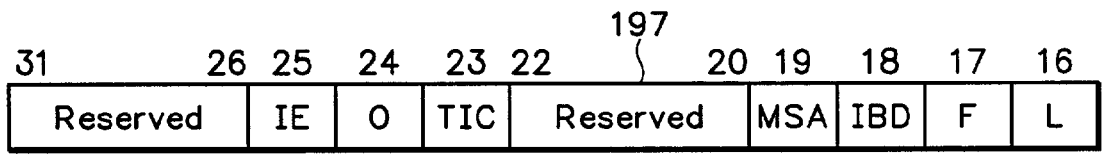
FIG. 22 is a diagram showing fields in a DMA control and status field of the buffer descriptor shown in FIG. 21.

FIG. 22 is a diagram showing specific bit assignments in the DMA Control and Status field 197. An IE (Interface Error) status bit indicates that an interface error occurred during the buffer DMA. The status register for the interface indicates the specific error. An O (Ownership) bit, if set, indicates that the DMAC has ownership of the buffer. A TIC (Tx Interface Control) bit, if set, indicates that TDMAC x is to write the Interface status/Control word of the last buffer descriptor, to the Tx FIFO after the TDMAC has DMAed the bytes in the Tx packet into the Tx FIFO. A MSA (Max Rx DMA size Exceeded Abort) status bit indicates that the packet DMA was aborted because the size of the packet being received exceeded the Mx Rx DMA size limit. A IBD (Interrupt when Buffer DMA Done) control bit indicates that the DMAC 42 should interrupt when it has terminated DMA for the buffer.

F and L (First and Last) status/control bits indicates how the buffer relates to the packet received or transmitted. If the buffer is for a transmit channel, the CPU 16 must set these bits appropriately. If the descriptor is for a receive channel, the DMAC 42 set these bits appropriately when the DMA of the buffer terminates. For example, First=1 and Last=1 indicates the packet is contained completely within this buffer. First=1 and Last=0 indicates the first buffer of a multi-buffer packet. First=0 and Last=0 indicates a middle buffer. A packet may have multiple middle buffers. First=0 and Last=1 indicates the last buffer of a multi-buffer packet.

DMAC Address and Control Registers

All channels coupled to the DMAC share address and control logic. Each channel gets a portion of the Bbus bandwidth as setup by the CPU via the DMAC time slot assignment registers. When a channel becomes the "current" channel (the channel being "serviced"), its "context" is swapped into the appropriate registers/counters from the holding registers 192. When a channel is first enabled and becomes the current channel, the DMAC 42 fetches the descriptor pointed to by the value in the current channel's current descriptor pointer register. The DMAC 42 then initializes the data buffer pointer (loaded into current address counter), next descriptor pointer, DMA control and status registers and the byte counter from the values in the descriptor stored in memory 70.

Figure 23:
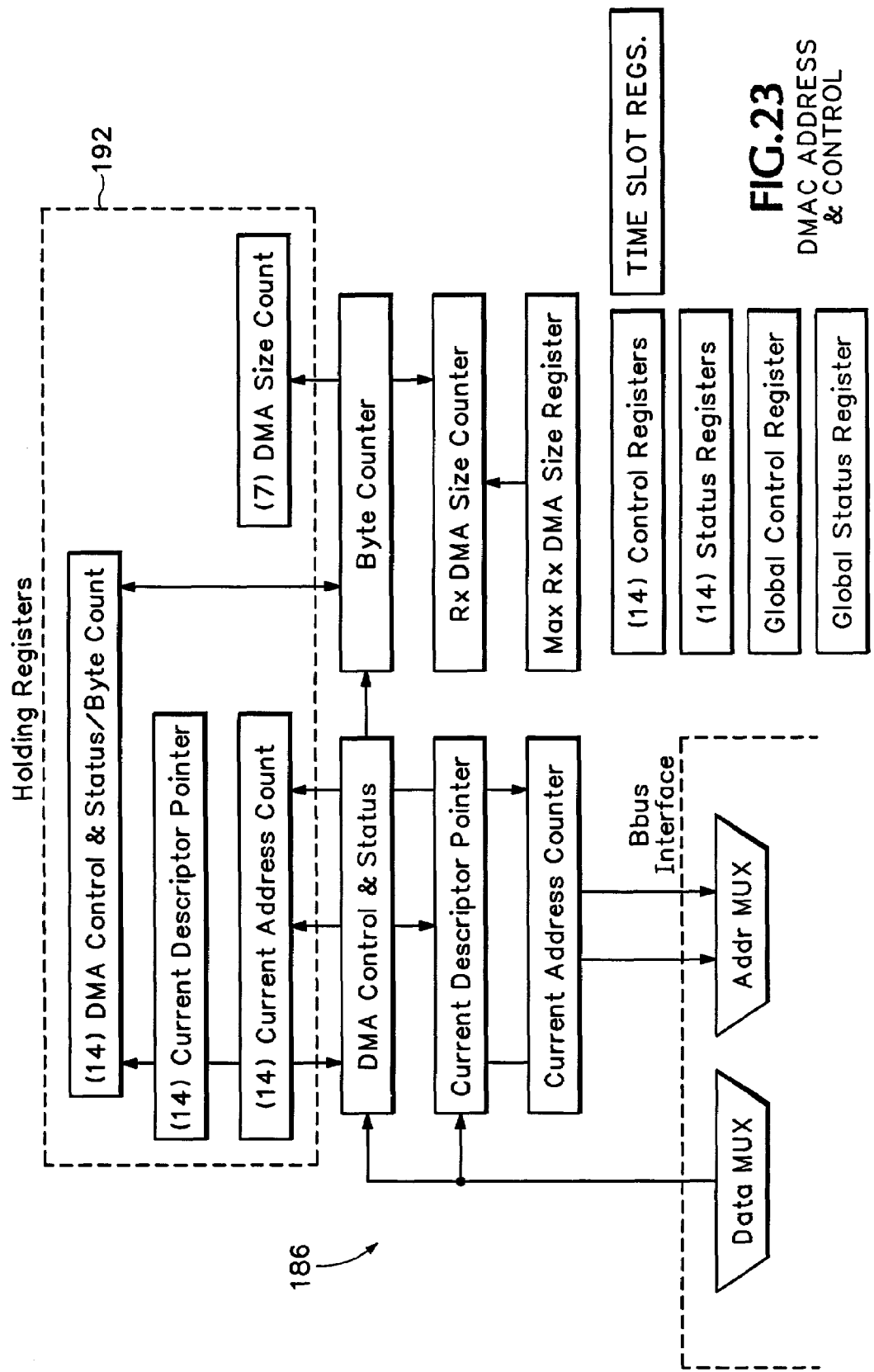
FIG. 23 is a diagram of control circuitry and registers in the direct memory access controller shown in FIG. 19.

FIG. 23 shows the different holding registers 192 address and counter logic 186 and global registers in the DMAC 42.

Current Address Counter: A current address counter (CAC) is loaded with the value in the data buffer pointer register if DMA of a data block is to be performed. The current descriptor pointer is loaded into the current address counter if the DMAC 42 will be fetching a buffer descriptor or updating the status in the buffer descriptor. The CAC is incremented or decremented for each byte transferred.

Byte Counter: For receive, each Rx DMA channel is configured with a static data buffer size from the channel's Rx buffer size register. On transmit, the buffer size is set to the value in the byte counter field in the buffer descriptor 196. The byte count is decremented for each byte DMA'd. If the byte counter register reaches zero before a packet has been completely received or transmitted, the DMAC will fetch the next buffer descriptor pointed to by the next descriptor pointer. The byte counter register is reloaded from the Rx Buffer Size register for a receive channel, or from the value in the next buffer descriptor for a transmit channel at the start of DMA of each buffer. On receive, the byte counter value is written to the byte count field of the buffer descriptor 196 when the DMA of the buffer terminates. The byte counter value is not updated on transmit.

Max Rx DMA Size: The maximum amount of receive data that can be transferred by the DMAC 42 is limited by the Max RX DMA Size register. The value loaded is the maximum number of bytes allowed to be DMA'd on reception of a packet. The Max RX DMA Size register avoids giant receive packets consuming large amounts of memory. The value in the Max RX DMA Size register is loaded into the 16 bit DMA size counter at the start of a receive DMA transfer. The DMA size counter is decremented for each byte transferred. If the counter reaches zero before the end of packet is received, the RDMAC can be configured to abort the packet reception and DMA, and possibly generate an interrupt.

Holding Registers: All DMA channels share address and byte count logic. The holding registers provide temporary storage of the DMA context data (i.e., Current Address, Current Byte count, etc.) of DMAs in progress for all channels. These registers are also used by the CPU 16 to initialize and manipulate the DMAC 42. There are 14 sets of Holding Registers; one set for each Rx and Tx channel.

The holding registers include the following:

Current Address Count: Current Address Counter value;

Current Descriptor Pointer: Address of current buffer descriptor; DMA Control and Status/Byte Count: DMA Control and Status and current Byte count; and DMA Size Count: Current Rx DMA size count for Rx channels.

The values in the shared registers/counter in the DMAC 42 are swapped with the values in the holding registers whenever the DMAC needs to switch to servicing another channel. The holding Registers are accessed by the CPU 192 to initialize a channel's first buffer descriptor pointer.

User Definable I/O

Figure 24:
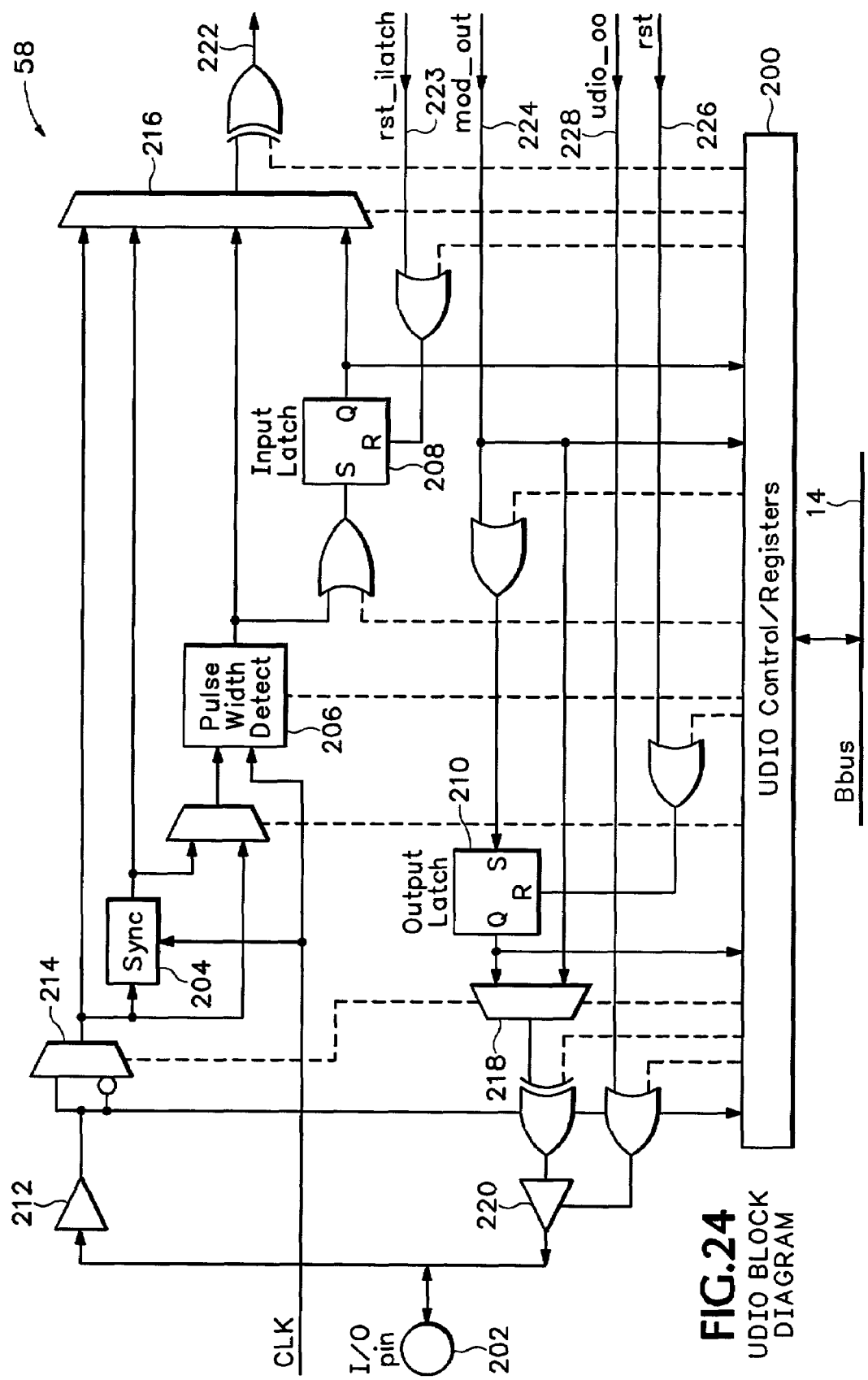
FIG. 24 is a detailed block diagram of a user definable I/O circuit for the router shown in FIG. 1.

FIG. 24 is a detailed circuit diagram of the user definable I/O circuit (UDIO) 58 previously shown in FIG. 1. The UDIO 58 includes multiple user definable I/O pins 202 that are used to interface miscellaneous peripheral devices that do not necessarily warrant dedicated pins. For example, the user definable I/O pins 202 are used for interfacing external interrupt lines to the CPU 16, modem control signals for modems coupled to the UART 52 or the serial channels 51 and as drivers for LED's. The UDIOs 58 can be configured as follows:

| Inputs: | async unlatched | Outputs: | hi/lo true |
| | sync unlatched | | latched or unlatched |
| | high or low true | | |
| | sync latched | | |

The UDIO 58 includes an input path that couples the I/O pins 202 through an input buffer 212, and programmable inverter 214 to a synchronizer 204. The synchronizer 204 is coupled to a pulse width detector 206 and to an input multiplexer 216. The output of pulse width detector 206 is coupled to an input latch 208 and to the multiplexer 216. The input latch 208 is reset by an internal signal 223 and is coupled at the output to multiplexer 216. An output path of the UDIO 58 includes an output latch 210 that is set by internal line 224 and reset by internal line 226. The output of latch 210 is coupled through a multiplexer 218 and an output buffer 220 to the I/O pins 202. The configuration of the UDIO pins 202 and the internal UDIO circuitry is controlled by control and status registers (CSR) 200.

Figure 25:
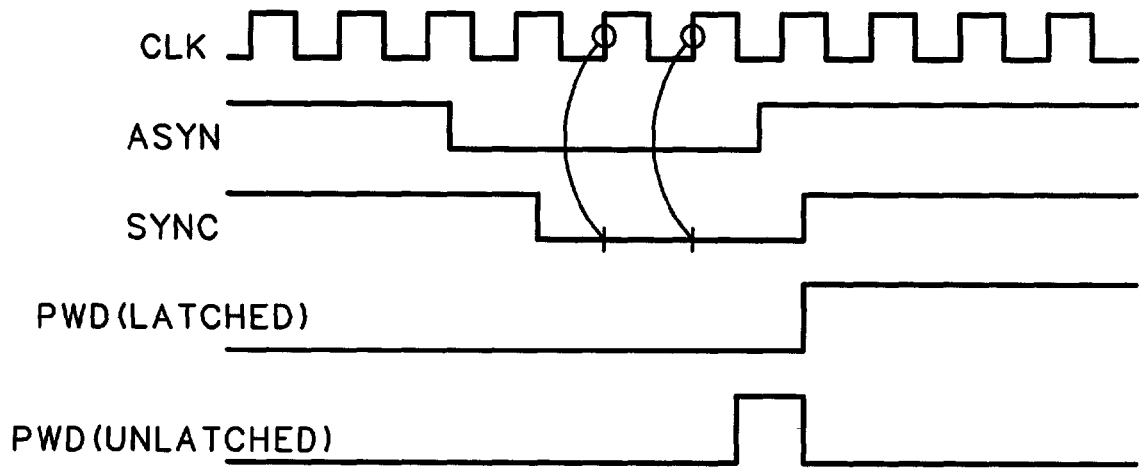
FIG. 25 is a timing diagram for the user definable I/O circuit shown in FIG. 24.

Referring to FIGS. 24 and 25, an asynchronous input signal ASYN is received from one of the I/O pins 202, through the input buffer 212 and into programmable inverter 214. The synchronizer 204 is used to synchronize the ASYN signal into a SYNC signal that is synchronized with a system clock CLK. The pulse width detector (PWD) 206 is used to detect a minimum pulse width for the input signal. A minimum pulse width may be required for a valid input signal. If a signal changes logic levels for less than the minimum pulse width, the signal is considered noise or some other invalid condition.

The PWD 206 receives either the ASYN signal from the I/O pin 202 or the SYN signal output from the synchronizer 204. The PWD 206 counts the number of clocks that the input signal remains in a given logic state. The number of clocks are programmable through the control registers 200. If the input signal stays in the asserted state for the minimum pulse width, the PWD 206 asserts a high true pulse for one clock system (PWD unlatched).

FIG. 25 shows timing for a programmed minimum pulse width of two clock cycles and the unlatched and latched output from the PWD 206. The input latch 208 is set by the PWD 206 or by registers 200 and reset by internal router signal 223. The current state of the input latch 208 is readable through registers 200. The internal UDIO signal 222 is configurable to be driven by either the UDIO input pins 202 (asynchronous unlatched), synchronizer 204 (synchronous unlatched), PWD 206 (one clock pulse), or the input latch 208 (latched). The signal 222 is configurable as inverted or non-inverted.

When operating as an output, the UDIO 58 is configurable as either inverted or non-inverted, unlatched or latched. The output latch 210 is set via 224 or reset via an internal reset signal 226 or from the CSR 200. If configured as an output, the output buffer 220 is driven from the output latch 210 or from an unlatched internal signal 224. The output signal is configurable as inverted or non-inverted.

If the UDIO output is configured as unlatched, the input to the UDIO tristate output buffer 220 is driven directly from line 224. If the UDIO output is configured as latched, buffer 220 is driven from the output latch 210. The output latch 210 is set via 224 or CSR 200, or reset by the CSR 200 or from an internal signal 226. The state of the output latch 210 is readable through CSR 200. Buffer 220 is tristated via the CSR 200 or by an internal signal 228. The UDIO output enable control allows the output to be used in bused configurations, or as an open-collector output.

The CSR registers 200 have bit locations that are used to control the following UDIO functions. An input Latch reset bit (IRST (W)) causes the input latch 208 to reset. If the input latch 208 is being set by the hardware at the same time, the latch 208 will not reset via this bit. An input latch set bit (ISET: (W)) sets the input latch 208. An input high true bit (IHIT: (R/W)), if not set, inverts the input signal. An input pulse width detect asynchronous bit (IPWA: (R/W)), if set, inputs the signals from pins 202 directly to PWD 206 and is not synchronized to the system clock.

A module input negative bit (MIN: (R/W)), if set, inverts the signal 222 output from multiplexer 216. Input mux select bits (ISEL 2-0: (R/W)) select which input signal is routed out of the UDIO to line 222. IF ISEL is set to a reserved value, a '0' is routed to the module effectively disabling the UDIO input.

| ISEL | Module Input Mux Source Selected |
| --- | --- |
| 000 | Synchronizer = Unlatched, synchronized |
| 001 | Input Pin = Unlatched, asynchronous |
| 010 | Input Latch = Latched |
| 011 | Pulse Width Detect = One shot |
| 100-111 | reserved |

Input pulse width select bits (IPW 3-0: (R/W)) select the minimum pulse width for which the PWD 206 will generate a one system clock wide output pulse.

| IPW | Minimum Pulse width (time if 40 Mhz system clock) |
| --- | --- |
| 0000 | 1 clock (25 nsec) |
| 0001 | 2 clocks (50 nsec) |
| 0010 | 8 clocks (200 nsec) |
| 0011 | 32 clocks (800 nsec) |
| 0100-1111 | 256 clocks (6.4 microseconds) |

An input pin status bit (IPIN: (R)) identifies the current state of the input pin. An input latch status bit (ILCH: (R)) identifies the current state of the input latch. An output latch reset bit (ORST: (W)) causes the output latch to reset by writing a '1'. An output latch set bit (OSET:(W)) sets the output latch by writing a '1'. An output pin hi true bit (OHIT: (R/W)), if not set, inverts signal 222 output from the UDIO. An output pin enable bit (OPEN: (R/W)), if set, enables the UDIO output pin. An output latch status bit (OLCH: (R)) identifies the current state of the output latch 210. Output mux select bits (OSEL2-0:(R/W), select which output signal is routed out to the UDIO output pin 202. If a reserved value is used, a '0' will be selected.

| OSEL | UDIO Output Mux Source Selected |
| --- | --- |
| 000 | Output Latch |
| 001 | Internal Signal 224 Output |
| 010-111 | reserved |

The UDIO circuit 58 is programmable to accommodate different input and output signaling environments. For example, serial lines may carry modem control signals. The modem control signal is asynchronous to the router clock and has a minimum pulse width. The UDIO 58 synchronizes the modem signals with the router clock and then detects a preprogrammed pulse width in order to identify valid logic state changes. In one embodiment, the UDIO 58 is configurable as an output to drive LEDs 102 (FIG. 2). The internal signal driving the UDIO 58 may activate the LEDs to identify different router conditions such as power on, active channels, CPU 16 active, etc. Thus, the router 12 can interface with a wider variety of peripheral devices than current router architectures.

In-Circuit Emulation Circuit

Figure 26:
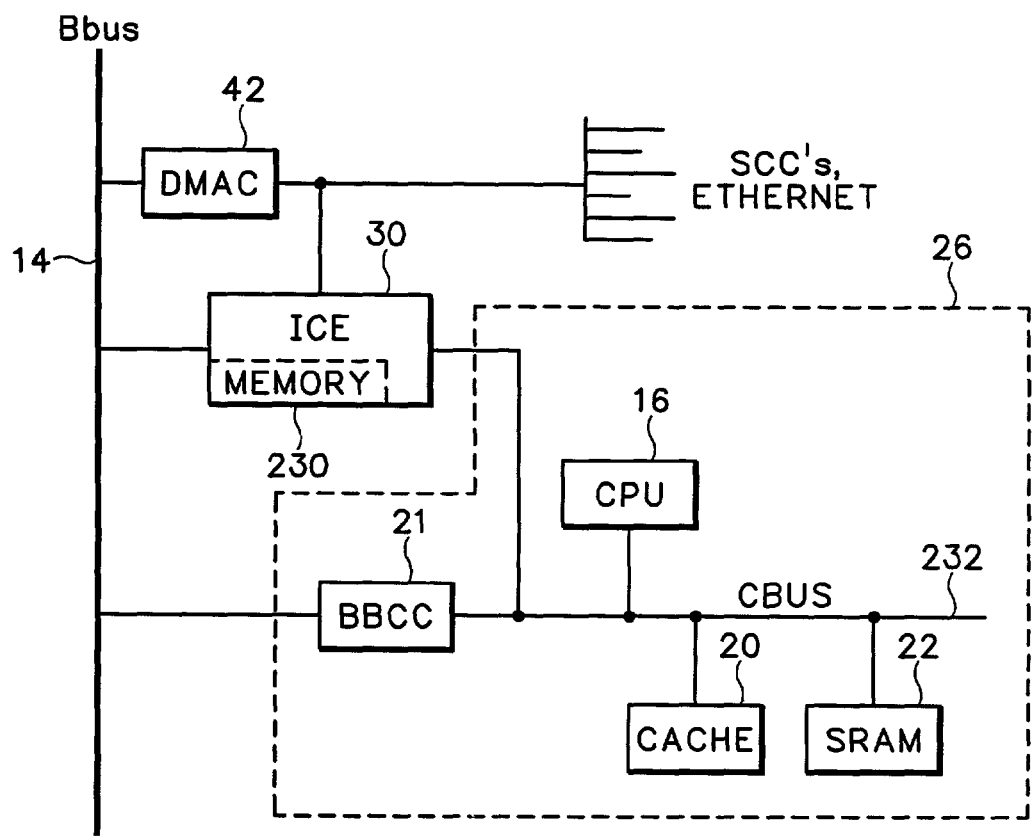
FIG. 26 is a block diagram showing an in-circuit emulator for the router shown in FIG. 1.

FIG. 26 is a diagram of the in-circuit emulator (ICE) 30 and the CPU block 26 previously shown in FIG. 1. The ICE 30 is coupled between the Bbus 14, the DMAC 42 and an internal Cbus 232 inside the CPU block 26. The CPU block 26 includes the CPU 16, cache 20, SRAM 22 and other internal processing elements.

The signals on the Cbus 232 and DMAC 42 are not accessible through external I/O pins. Thus, many of the internal signals and registers in the CPU block 26 and DMAC 42 cannot be traced during debugging. For example, the CPU 16 may be operating through CACHE 20 or SRAM 22. Since communications between CPU 16 and the cache 20 is conducted exclusively on the internal Cbus 232, the current state of the CPU 16 and the data in cache 20 cannot be monitored. ICE 30 is coupled between the Bbus 14 and the internal Cbus 232 in order to trace internal signals on the Cbus. The ICE 30 operates as a logic analyzer selectively saving signal and register values in internal memory 230.

Figure 27:
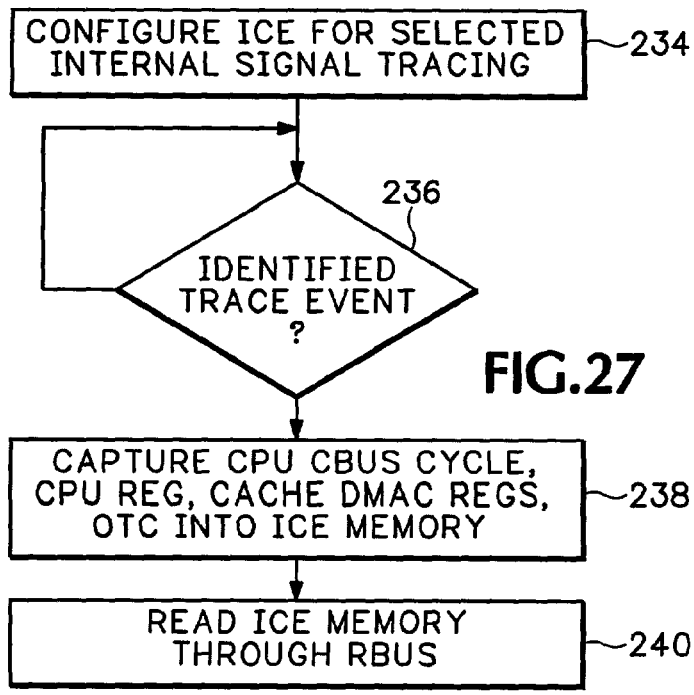
FIG. 27 is a step diagram showing an example of how the in-circuit emulator conducts internal signal tracing.

FIG. 27 is a step diagram showing the basic steps performed by the ICE 30. The ICE 234 is configured in step 234 to trace different Cbus signals, internal CPU or DMAC registers, cache memory locations, etc. The ICE 30 is programmed to trace signals during specific events such as between programmed address ranges or during specific memory accesses (e.g., CPU to cache). Decision step 236 monitors the Cbus 232 for the programmed trace events.

When one of the trace events occurs, step 238 captures the CPU Cbus cycle, CPU register, memory location, etc., which was identified for tracing. The trace data is then loaded into memory 230 (FIG. 26). The trace data in memory 230 is then accessible through the Bbus 14. The CPU 16 normally controls the ICE 30 and examines the trace memory contents. The trace data can also be output through the Rbus.

Figure 28:
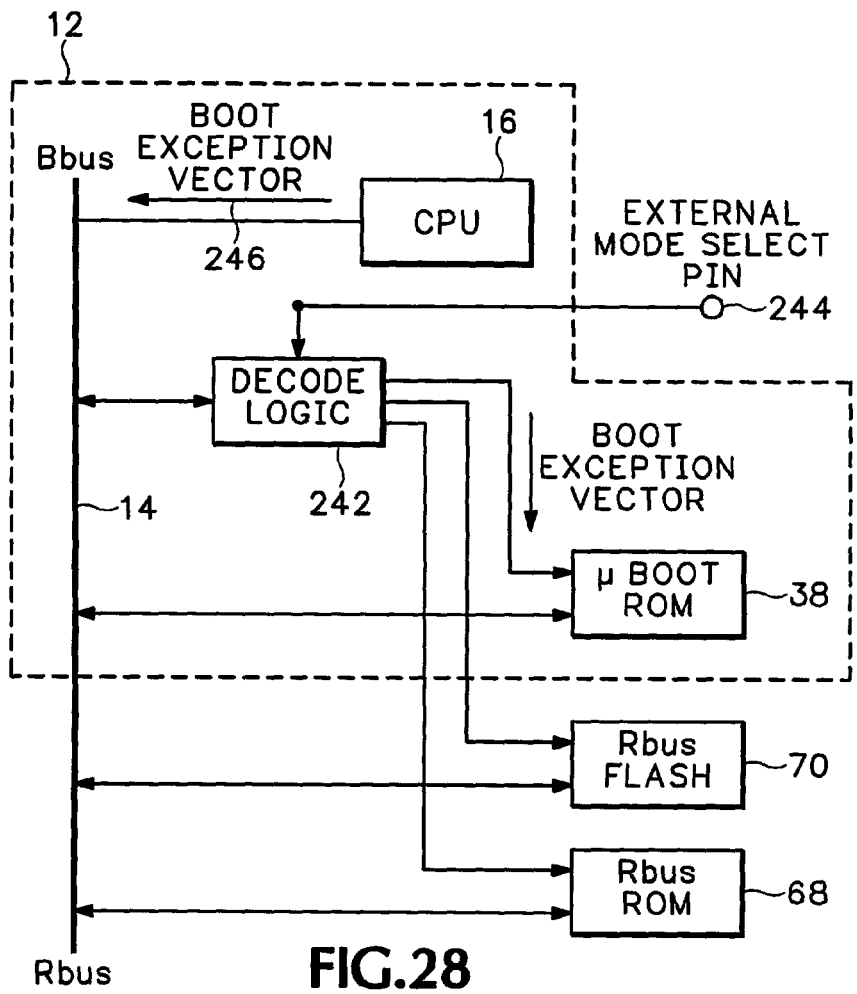
FIG. 28 is a block diagram of a boot-up system used in the router shown in FIG. 1.

Selectable Boot-up ROM FIG. 28 is a block diagram showing a selectable boot-up system for the router 12. A dedicated microboot ROM 38 is coupled to the Bbus 14 and is loaded with bootstrap code for initializing the router 12 into an operational state. The bootstrap code in microboot ROM 38 is used for sizing and configuring DRAM 70 and initializing router processing elements, a console coupled to UART 52 (FIG. 2), the Ethernet interface, etc. The dedicated microboot ROM 38 allows the CPU to boot up regardless of whether other devices on the RBus are operational. For example, the microboot ROM 38 can initialize the router 12 even if external memory 70 is inoperable.

After a reset, the CPU 16 generates a boot exception vector 246 which is a specific address for beginning system boot-up. Typically, the boot exception vector 246 addresses the microboot ROM 38 to begin executing microboot code. If the code in microboot ROM 38 is no longer valid, the boot exception vector can be redirected via decode logic 242 to alternative memory locations such as external flash memory 70 or ROM memory 68 connected to the external Rbus interface (FIG. 2).

The decode logic 242 monitors a mode select pin 244 on the router 12. If pin 244 is not asserted, the decode logic selects the microboot ROM 38 for reading the microboot exception vector. If the external pin 244 is asserted, the decode logic 242 points the boot exception vector to external memory such as external flash memory 70 or external ROM 68. Thus, the router 12 is capable of redirecting initial system boot-up code to different external memory devices.

RBus External Interface

Referring to FIGS. 1-3, the external Rbus interface 56 allows access to external devices and allows external device access to the Bbus 14. External accesses are software-selectable via a Rbus Master control register (not shown) as either asynchronous or synchronous to the router clock. External ROM/Flash/SRAM is accessed via the Rbus.

Dual PC Card Interface

The dual PC card controller 54 provides support for two PC card sockets. The controller 54 works between the attached PC card and the external Bbus interface 56 to handle all the control signals. The PC card controller is capable of handling DMA operations originated from either the CPU 16 or a PC card. Although the PC card controller 54 carries out the DMA operation, the actual DMA controller resides inside the external Rbus interface 56.

Figure 29:
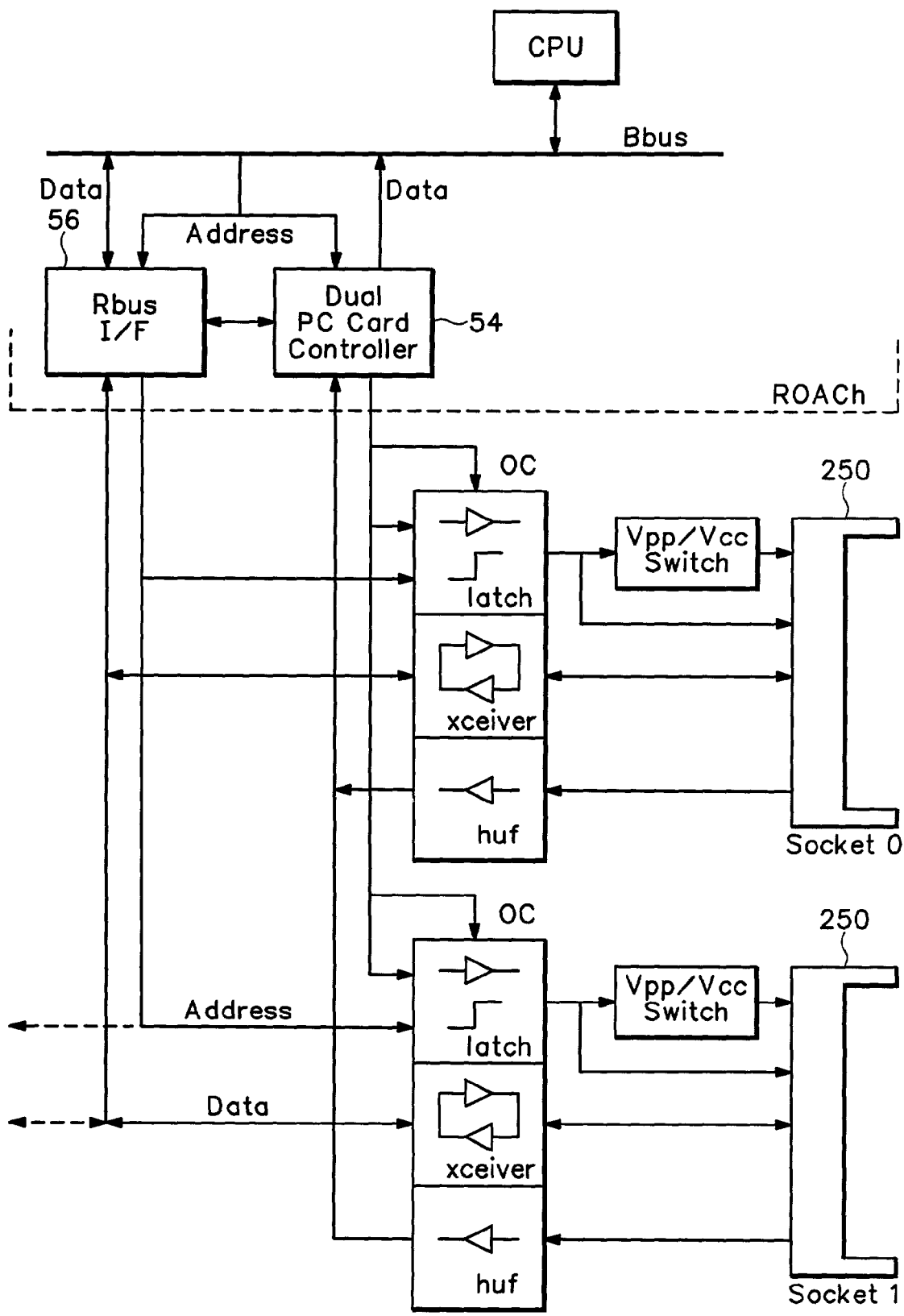
FIG. 29 is a block diagram showing interfaces to a PC card controller used in the router shown in FIG. 1.

FIG. 29 is a diagram of the interfacing to the PC card controller 54. There are registers in the PC card controller 54 for each socket 250. The CPU 16 initializes and sets up the PC card controller 54 to collect information regarding the condition or status of the PC cards connected to sockets 250.

There are two DMA channels for the two PC card sockets 250. CPU 16 can initiate a DMA operation by programming one of the two channels inside the external Rbus interface 56 to provide information such as the source address, destination address, operation type (read or write) and byte count. The PC card controller 54 generates DMA and continuously requests the external Rbus I/F 56 until the external interface 56 asserts the end of the DMA operation. For a DMA read operation, data moves into the PC card. Each DMA read request from the PC card controller 54 requires the external I/F 56 to do two bus arbitrations before asserting a DMA read acknowledge. A first bus arbitration moves data from the source address into internal storage and the second arbitration deposits DMA data from internal storage onto the external Rbus.

Some peripherals such as network and multimedia cards are capable of initiating DMA operations. These cards are identified with information in the attribute area of the card. The CPU 16 fetches the data and configures the PC card controller 54. To set up a PC card initiated DMA operation, the CPU 16 first programs a DMA channel inside the external Rbus interface 56 for a starting memory address, transfer count and the direction of the DMA transfer. The PC card is initialized with a starting address. The PC card is then ready to accept a command to initiate the DMA data transfer. For a DMA read operation, the starting address in the DMA channel is used as the source address and the starting address in the PC card is used as the destination address. For a DMA write operation, the starting address in the DMA channel is used as the destination address and the starting address in the PC card is used as the source address.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A method for transferring data in a network processing device, comprising:
    reading a current entry in a receive memory;
    identifying a time slot period for receiving the data according to the current entry in the receive memory;
    identifying a current receive channel register in the network processing device to write the received data according to the current entry in the receive memory;
    receiving data for the identified time slot period into the identified current receive channel register;
    moving the current entry to a next entry in the receive memory when the time slot period expires;
    identifying a next time slot period and a next receive channel register according to the next entry in the receive memory;
    receiving data into the identified next receive channel register for the identified next time slot period; and
    waiting for a next synchronization pulse before shifting data into the receive channel register associated with the beginning entry.

2. A method for transferring data in a network processing device, comprising:
    reading a current entry in a receive memory;
    identifying a time slot period for receiving the data according to the current entry in the receive memory;
    identifying a current receive channel register in the network processing device to write the received data according to the current entry in the receive memory;
    receiving data for the identified time slot period into the identified current receive channel register;
    moving the current entry to a next entry in the receive memory when the time slot period expires;
    identifying a next time slot period and a next receive channel register according to the next entry in the receive memory;
    receiving data into the identified next receive channel register for the identified next time slot period; and
    moving to a beginning entry in the receive memory whenever a synchronization pulse is detected.

3. A method for transferring data in a network processing device, comprising:
    reading a current entry in a receive memory;
    identifying a time slot period for receiving the data according to the current entry in the receive memory;
    identifying a current receive channel register in the network processing device to write the received data according to the current entry in the receive memory;
    receiving data for the identified time slot period into the identified current receive channel register;
    moving the current entry to a next entry in the receive memory when the time slot period expires;
    identifying a next time slot period and a next receive channel register according to the next entry in the receive memory;
    receiving data into the identified next receive channel register for the identified next time slot period;
    reading a current entry in a transmit memory;
    identifying a time slot period for transmitting the data according to the current entry in the transmit memory;
    identifying a current transmit channel register in the network processing device according to the current entry in the transmit memory;
    transmitting data for the identified time slot period out from the identified current transmit channel register;
    moving to a next entry in the transmit memory when the time slot period expires;
    identifying a next time slot period and a next transmit channel register according to the next entry in the transmit memory; and
    transmitting data out from the identified next transmit channel register for the identified next time slot period.

4. A method according to claim 3 including moving to a beginning entry in the transmit memory when a last entry is identified in the transmit memory and the time slot period expires.

5. A method according to claim 4 including waiting for a next synchronization pulse before writing data into the transmit channel register identified by the beginning entry.

6. A method according to claim 3 including moving to a beginning entry in the transmit memory whenever a synchronization pulse is detected.

7. A method according to claim 3 including loading different entries into the receive memory and transmit memory according a TDM data stream format used for transmitting and receiving the data.

8. A method according to claim 3 including reading the receive memory and receiving data into the receive channel registers and reading the transmit memory and transmitting data out from the transmit channel registers at the same.

9. A system for transferring data in a network processing device, comprising:
    means for reading a current entry in a receive memory;
    means for identifying a time slot period for receiving the data according to the current entry in the receive memory;
    means for identifying a current receive channel register in the network processing device to write the received data according to the current entry in the receive memory;
    means for receiving data for the identified time slot period into the identified current receive channel register;
    means for moving the current entry to a next entry in the receive memory when the time slot period expires;
    means for identifying a next time slot period and a next receive channel register according to the next entry in the receive memory;
    means for receiving data into the identified next receive channel register for the identified next time slot period; and
    means for moving to another entry in the receive memory according to a detected synchronization pulse.

10. A system according to claim 9 including means for moving to a beginning entry in the receive memory when a last entry is identified in the receive memory and the time slot period expires.

11. A system for transferring data in a network processing device, comprising:
    means for reading a current entry in a receive memory;
    means for identifying a time slot period for receiving the data according to the current entry in the receive memory;
    means for identifying a current receive channel register in the network processing device to write the received data according to the current entry in the receive memory;
    means for receiving data for the identified time slot period into the identified current receive channel register;
    means for moving the current entry to a next entry in the receive memory when the time slot period expires;
    means for identifying a next time slot period and a next receive channel register according to the next entry in the receive memory;

means for receiving data into the identified next receive channel register for the identified next time slot period; and means for waiting for a next synchronization pulse before shifting data into the receive channel register associated with the beginning entry.

12. A system for transferring data in a network processing device, comprising:

means for reading a current entry in a receive memory;

means for identifying a time slot period for receiving the data according to the current entry in the receive memory;

means for identifying a current receive channel register in the network processing device to write the received data according to the current entry in the receive memory;

means for receiving data for the identified time slot period into the identified current receive channel register;

means for moving the current entry to a next entry in the receive memory when the time slot period expires;

means for identifying a next time slot period and a next receive channel register according to the next entry in the receive memory;

means for receiving data into the identified next receive channel register for the identified next time slot period; and means for moving to a beginning entry in the receive memory whenever a synchronization pulse is detected.

13. A system for transferring data in a network processing device, comprising:

means for reading a current entry in a receive memory;

means for identifying a time slot period for receiving the data according to the current entry in the receive memory;

means for identifying a current receive channel register in the network processing device to write the received data according to the current entry in the receive memory;

means for receiving data for the identified time slot period into the identified current receive channel register;

means for moving the current entry to a next entry in the receive memory when the time slot period expires;

means for identifying a next time slot period and a next receive channel register according to the next entry in the receive memory;

means for receiving data into the identified next receive channel register for the identified next time slot period;

means for reading a current entry in a transmit memory;

means for identifying a time slot period for transmitting the data according to the current entry in the transmit memory;

means for identifying a current transmit channel register in the network processing device according to the current entry in the transmit memory;

means for transmitting data for the identified time slot period out from the identified current transmit channel register;

means for moving to a next entry in the transmit memory when the time slot period expires;

means for identifying a next time slot period and transmit channel register according to the next entry in the transmit memory; and means for transmitting data out from the identified next transmit channel register for the identified next time slot period.

14. A system according to claim 13 including means for moving to a beginning entry in the transmit memory when a last entry is identified in the transmit memory and the time slot period expires.

15. A system according to claim 14 including means for waiting for a synchronization pulse before writing data into the transmit channel register identified by the beginning entry.

16. A system according to claim 13 including means for moving to a beginning entry in the transmit memory whenever a synchronization pulse is detected.

17. A system according to claim 13 including means for loading different entries into the receive memory and transmit memory according a TDM data stream format used for transmitting and receiving the data.

18. A system according to claim 13 including means for reading the receive memory and receiving data into the receive channel registers and reading the transmit memory and transmitting data out from the transmit channel registers at the same.

* * * * *